(12) United States Patent
Wissmann et al.

(10) Patent No.: US 11,073,472 B2
(45) Date of Patent: Jul. 27, 2021

(54) METHODS AND APPARATUS FOR CHARACTERIZING A SPECIMEN USING PATTERN ILLUMINATION

(71) Applicant: Siemens Healthcare Diagnostics Inc., Tarrytown, NY (US)

(72) Inventors: Patrick Wissmann, Munich (DE); Ludwig Listl, Munich (DE); Benjamin S. Pollack, Jersey City, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 120 days.

(21) Appl. No.: 16/349,057

(22) PCT Filed: Nov. 13, 2017

(86) PCT No.: PCT/US2017/061392
§ 371 (c)(1),
(2) Date: May 10, 2019

(87) PCT Pub. No.: WO2018/089935
PCT Pub. Date: May 17, 2018

(65) Prior Publication Data
US 2020/0191714 A1 Jun. 18, 2020

Related U.S. Application Data

(60) Provisional application No. 62/421,951, filed on Nov. 14, 2016.

(51) Int. Cl.
*G01N 21/51* (2006.01)
*G01N 21/41* (2006.01)
(Continued)

(52) U.S. Cl.
CPC .............. *G01N 21/51* (2013.01); *G01N 21/41* (2013.01); *G01N 21/59* (2013.01);
(Continued)

(58) Field of Classification Search
CPC . G01N 2021/5957; G01N 2035/00326; G01N 21/41; G01N 21/51; G01N 21/59;
(Continued)

(56) References Cited

U.S. PATENT DOCUMENTS 6,353,471 B1   3/2002   Samsoondar et al.
6,891,182 B2   5/2005   Watari et al.
(Continued)

FOREIGN PATENT DOCUMENTS

EP   1 186 893 B1   2/2008
EP   1 967 840 A2   10/2008
(Continued)

OTHER PUBLICATIONS

PCT International Search Report and Written Opinion dated Jan. 19, 2018 (11 Pages).
(Continued)

*Primary Examiner* — Hina F Ayub

(57) ABSTRACT

A characterization apparatus including pattern generation. The characterization apparatus is configured to characterize a specimen and/or a specimen container in some embodiments. The characterization apparatus includes an imaging location configured to receive a specimen container containing a specimen, one or more image capture devices located at one or more viewpoints adjacent to the imaging location, and one or more light panel assemblies including pattern generation capability located adjacent to the imaging location and configured to provide back lighting. Methods of imaging a specimen and/or specimen container using the pattern generation are described herein, as are other aspects.

22 Claims, 13 Drawing Sheets

(51) Int. Cl.
*G01N 21/59* (2006.01)
*G01N 35/00* (2006.01)
*G06T 5/50* (2006.01)

(52) U.S. Cl.
CPC ............... *G01N 35/00732* (2013.01); *G01N 2021/5957* (2013.01); *G01N 2201/0635* (2013.01)

(58) Field of Classification Search
CPC ..... G01N 2201/0635; G01N 35/00732; G01N 35/0099; G06T 2207/10144; G06T 2207/10152; G06T 2207/20221; G06T 2207/30072; G06T 5/50
See application file for complete search history.

(56) References Cited

U.S. PATENT DOCUMENTS

| | | | |
|---|---|---|---|
| 7,422,693 | B2 | 9/2008 | Carter et al. |
| 7,663,738 | B2 | 2/2010 | Johansson |
| 7,760,340 | B2 | 7/2010 | Hoshiko et al. |
| 7,771,659 | B2 | 8/2010 | Ziegler |
| 7,854,891 | B2 | 12/2010 | Yamamoto et al. |
| 7,982,201 | B2 | 7/2011 | Bryant et al. |
| 8,064,061 | B2 | 11/2011 | Yamamoto et al. |
| 8,194,235 | B2 | 6/2012 | Kosaka et al. |
| 8,380,444 | B2 | 2/2013 | Kim et al. |
| 8,381,581 | B2 | 2/2013 | Walsh et al. |
| 8,545,760 | B2 | 10/2013 | Yamamoto et al. |
| 8,859,289 | B2 | 10/2014 | Marty et al. |
| 9,547,784 | B1 | 1/2017 | Montag et al. |
| 2001/0004285 | A1 | 6/2001 | Cadell et al. |
| 2004/0101954 | A1 | 5/2004 | Graessle et al. |
| 2006/0067572 | A1 | 3/2006 | White et al. |
| 2006/0178578 | A1 | 8/2006 | Tribble et al. |
| 2007/0090309 | A1* | 4/2007 | Hu .................... G01N 21/8806 250/559.45 |
| 2011/0235875 | A1 | 9/2011 | Filkins et al. |
| 2011/0267450 | A1 | 11/2011 | Pronkine |
| 2012/0140230 | A1 | 6/2012 | Miller |
| 2012/0307032 | A1* | 12/2012 | Gomi ..................... A61B 5/103 348/77 |
| 2013/0076882 | A1 | 3/2013 | Itoh |
| 2013/0310990 | A1 | 11/2013 | Peret et al. |
| 2013/0314638 | A1* | 11/2013 | Ahn .................. G02F 1/133608 349/58 |
| 2014/0168398 | A1* | 6/2014 | Guo ....................... G01N 21/55 348/77 |
| 2014/0293036 | A1 | 10/2014 | Ddecaux et al. |
| 2015/0241209 | A1 | 8/2015 | Jouper et al. |
| 2015/0260978 | A1 | 9/2015 | Cremer et al. |
| 2015/0278575 | A1 | 10/2015 | Biomerieux et al. |
| 2016/0062098 | A1* | 3/2016 | Brown ................. A61B 5/0071 348/80 |
| 2017/0131197 | A1* | 5/2017 | Jain ........................ H04N 5/213 |
| 2017/0202483 | A1* | 7/2017 | Sorimoto ........... G01B 11/2518 |
| 2018/0372715 | A1 | 12/2018 | Kluckner et al. |
| 2019/0033230 | A1 | 1/2019 | Klucker et al. |
| 2019/0041318 | A1 | 2/2019 | Wissmann et al. |

FOREIGN PATENT DOCUMENTS

| | | |
|---|---|---|
| JP | H07-280814 A | 10/1995 |
| JP | 2000-502472 A | 2/2000 |
| JP | 2001-521205 A | 6/2001 |
| JP | 2006-505788 A | 2/2006 |
| JP | 2007-179770 A | 7/2007 |
| JP | 2010-060519 A | 3/2010 |
| JP | 2010-223676 A | 10/2010 |
| JP | 2011-149832 A | 8/2011 |
| JP | 2012-504252 A | 2/2012 |
| JP | 2012-226179 A | 11/2012 |
| JP | 2013-501937 A | 1/2013 |
| JP | 2014-501386 A | 1/2014 |
| JP | 2015-084055 A | 4/2015 |
| JP | 2015-533429 A | 11/2015 |
| WO | 00/036400 A1 | 6/2000 |

OTHER PUBLICATIONS

Extended EP Search Report dated Oct. 28, 2019 of corresponding European Application No. 17869272.9, 4 Pages.

* cited by examiner

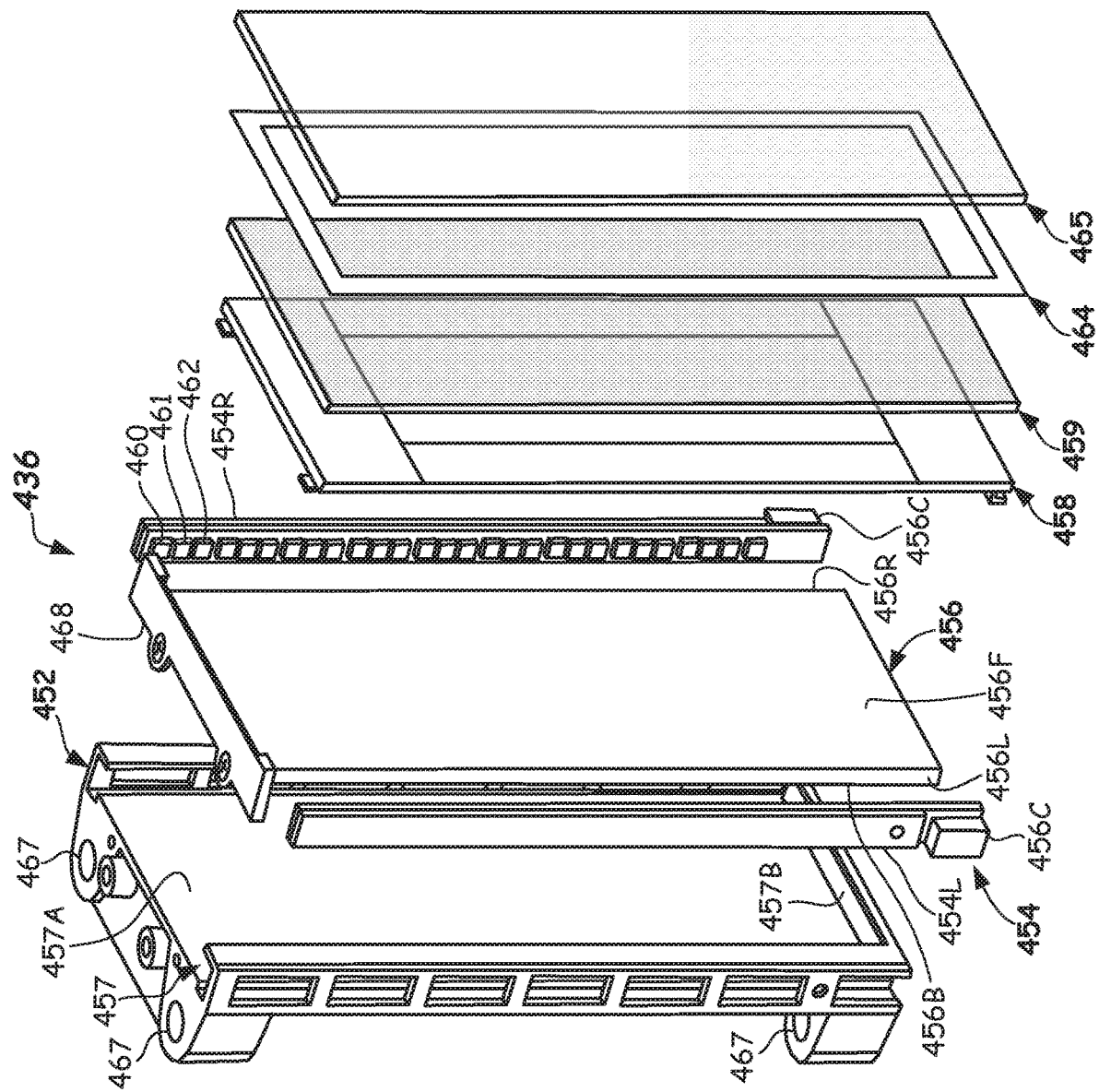

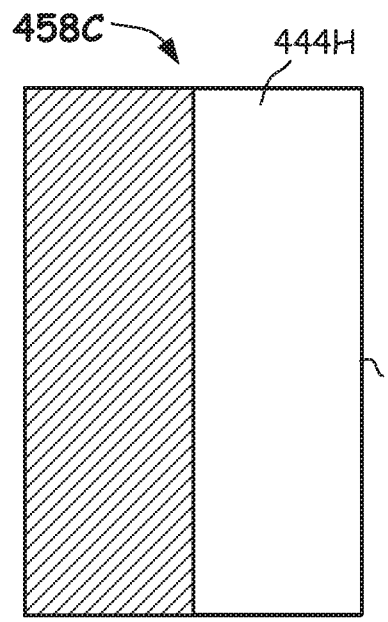
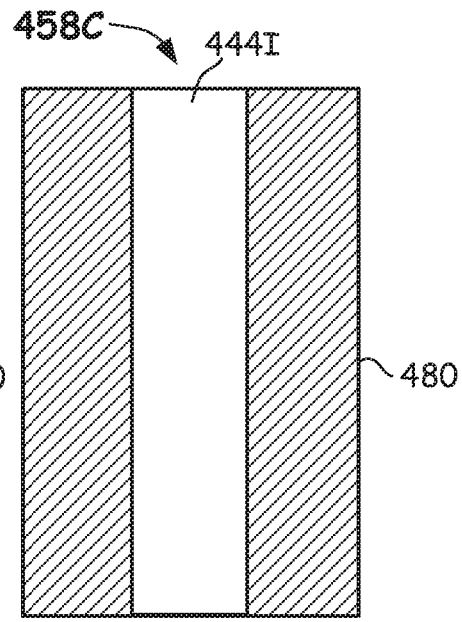
FIG. 4L  FIG. 4M
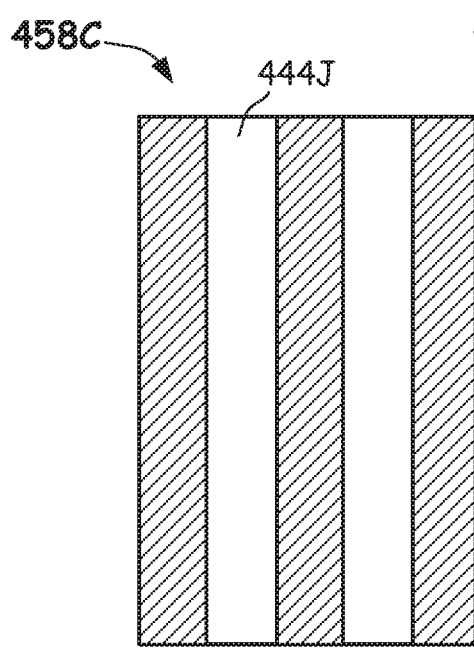
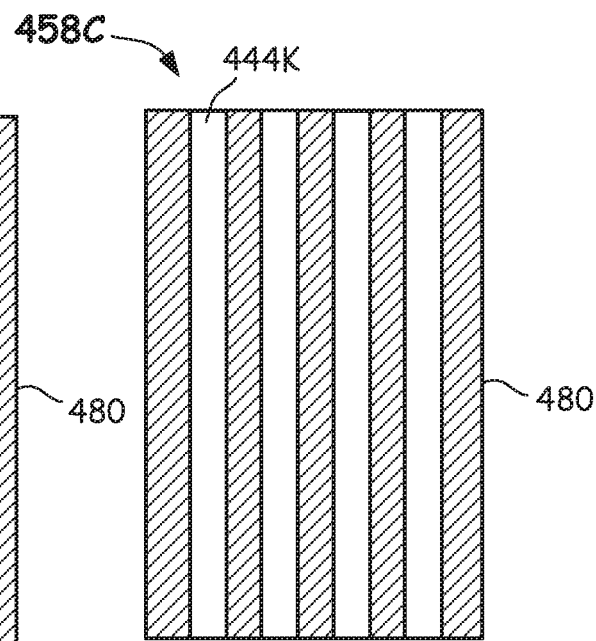
FIG. 4N  FIG. 4O

METHODS AND APPARATUS FOR CHARACTERIZING A SPECIMEN USING PATTERN ILLUMINATION

CROSS-REFERENCE TO RELATED APPLICATIONS

This application claims priority to U.S. provisional application Ser. No. 62/421,951 filed on Nov. 14, 2016, the contents of which is incorporated herein by reference in its entirety.

FIELD

The present disclosure relates to methods and apparatus for characterizing biological specimens, and, more particularly to methods and apparatus for characterizing specimen containers and/or the contents thereof.

BACKGROUND

Automated testing systems may conduct clinical chemistry or assays using one or more reagents to identify an analyte or other constituent in a biological specimen such as urine, blood serum, blood plasma, interstitial liquid, cerebrospinal liquids, and the like. For convenience and safety reasons, these specimens may be contained in specimen containers (e.g., blood collection tubes). The assay or test reactions generate various changes that may be read and/or otherwise manipulated to determine a concentration of the analyte or other constituent present in the specimen.

Improvements in automated testing technology have been accompanied by corresponding advances in automated pre-analytical sample preparation and handling operations such as batch preparation, centrifugation of specimen to separate specimen constituents, cap removal to facilitate specimen access, and the like, which may be part of a Laboratory Automation System (LAS). The LAS may automatically transport the specimens contained in barcode-labeled specimen containers on carriers to a number of automated pre-analytical specimen processing stations as well as to analytical stations containing clinical chemistry analyzers and/or assay instruments (collectively referred to as "analyzers" herein).

The LAS may handle all different sizes and types of specimen containers, and they may also be intermingled. The specimen container may include one or more barcode labels thereon. The barcode label may contain an accession number that may be correlated to demographic information that may be entered into a hospital's Laboratory Information System (LIS) along with test orders and other information. An operator may place the barcode-labeled specimen containers into the LAS, such as in a rack, and then a carrier may automatically transport the specimen containers for pre-analytical operations such as centrifugation, decapping, and aliquot preparation, and the like; all prior to the specimen actually being subjected to clinical analysis or assaying by the one or more analyzers that may be part of the LAS. In some cases, the one or more barcode labels adhered to the specimen container may obscure views of the specimen from at least some viewpoints.

For certain tests, an amount of a serum or plasma portion of the specimen obtained from whole blood by fractionation (e.g., centrifugation) may be aspirated and used. A gel separator may be added to the specimen container to aid in the separation of a settled blood portion from the serum or plasma portion in some cases. After fractionation and a subsequent de-capping process, the specimen container may be transported to an analyzer that may extract via aspiration, serum or plasma portion from the specimen container and combine the serum or plasma portion with one or more reagents in a reaction vessel (e.g., cuvette). Analytical measurements may then be performed, often using a beam of interrogating radiation, for example, or by using photometric or fluorometric absorption readings, or the like. The measurements allow for the determination of end-point or rate or other values, from which a concentration of analyte or other constituent in the specimen may be determined using well-known techniques.

However, automation of further test types is sought. Furthermore, existing testing systems may be deficient in some aspects.

SUMMARY

According to a first embodiment, a characterization apparatus is provided. The characterization apparatus includes an imaging location configured to receive a specimen container containing a specimen, an image capture device located adjacent to the imaging location, and a light panel assembly located adjacent to the imaging location configured to provide back lighting of the imaging location, the light panel assembly further configured to display a pattern.

According to another embodiment, a characterization apparatus is provided. The characterization apparatus including a specimen carrier locating a specimen container containing a specimen at an imaging location, a light panel assembly located adjacent the imaging location and configured to provide back lighting of the imaging location, the light panel assembly further configured to display a pattern, and an image capture device configured to capture an image of the pattern at the imaging location as imaged through the specimen container and specimen.

According to another aspect, a method of characterizing a specimen container and/or a specimen is provided. The method includes providing an imaging location configured to receive a specimen container containing a specimen thereat, providing one or more image capture devices adjacent to the imaging location, providing a light panel assembly configured to provide backlighting of the imaging location, displaying a pattern on a front face of the light panel assembly, and capturing an image of the pattern with the image capture device.

Still other aspects, features, and advantages of the present disclosure may be readily apparent from the following description by illustrating a number of example embodiments, including the best mode contemplated for carrying out the present invention. The present invention may also be capable of different embodiments, and its several details may be modified in various respects, all without departing from the scope of the present disclosure. Accordingly, the drawings and descriptions are to be regarded as illustrative in nature, and not as restrictive. The invention is to cover all modifications, equivalents, and alternatives falling within the scope of the appended claims listed below.

BRIEF DESCRIPTION OF THE DRAWINGS

The drawings, described below, are for illustrative purposes and are not necessarily drawn to scale. The drawings are not intended to limit the scope of the invention in any way.

FIG. 4C illustrates an exploded view of various components of the light panel assembly that is configured to generate a pattern on a front face according to one or more embodiments.

FIGS. 4L-4O illustrates additional pattern options that are displayable on a front face of a light panel assembly wherein the patterns comprise a Gray-code illumination sequence according to one or more embodiments.

DETAILED DESCRIPTION

Figure 1:
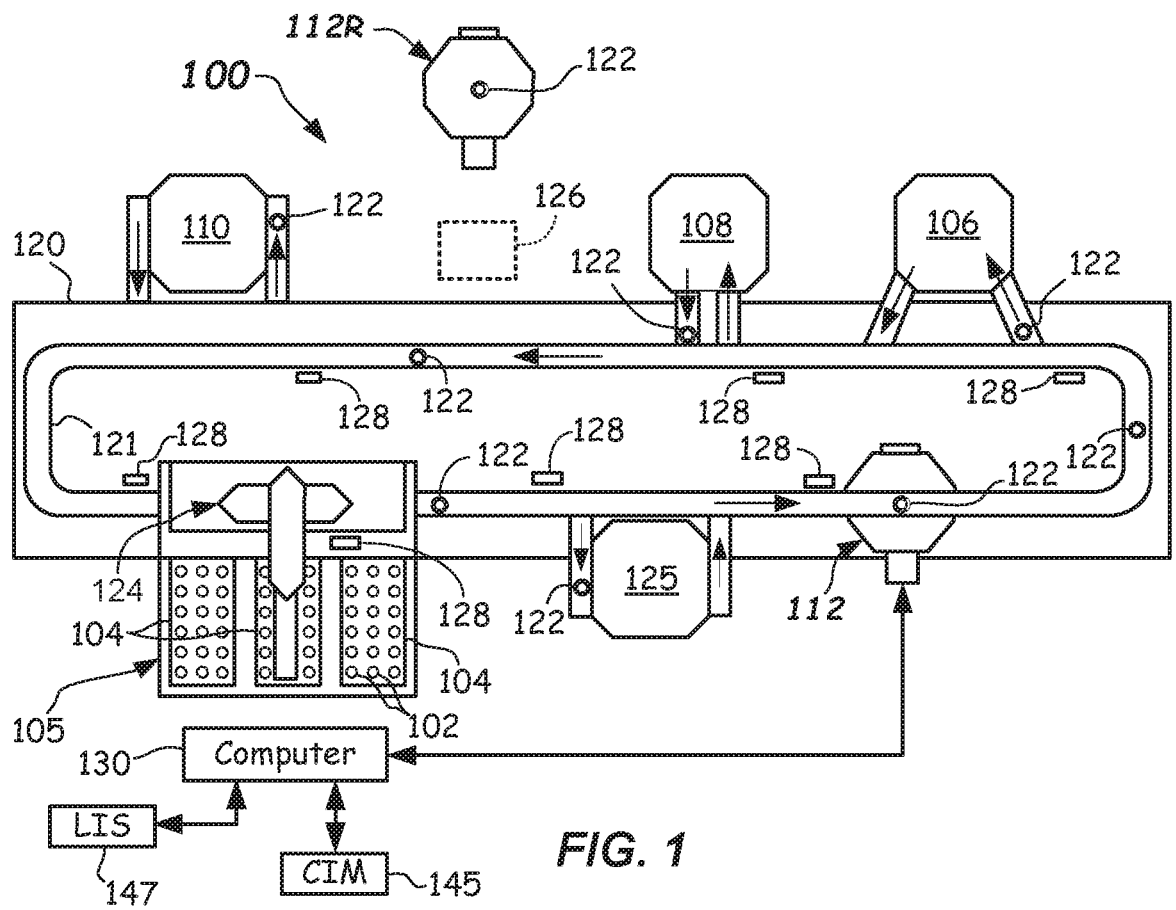
FIG. 1 illustrates a top schematic view of a testing apparatus including a characterization apparatus and one or more analyzers according to one or more embodiments.

In a first broad aspect, embodiments of the present disclosure provide methods and characterization apparatus adapted to optically image and to characterize a specimen contained in a specimen container and/or the specimen container positioned at an imaging location. The specimen container may be held in an upright orientation in a specimen carrier at the imaging location. The specimen carrier may be moved to the imaging location either manually, through the use of a robot, or via a track of a LAS. In one or more embodiments, the characterization involves producing a distinct pattern on a front face of a light panel assembly. In some embodiments, the distinct pattern on a front face of a light panel assembly may be changed or varied or otherwise switched to another pattern. The light panel assembly is positioned adjacent to the imaging location so that light panel assembly can provide backlight illumination of the imaging location.

During the characterization, the pattern is optically imaged by an image capture device (e.g., digital camera, or the like) through the specimen container and/or specimen contained at an imaging location. "Pattern" as used herein means that some portion of the front panel of the light panel assembly capable of producing backlight is lighted and some portion is unlighted, wherein the lighted portion constitutes the pattern. In other words, the light panel assembly is configured to display an illumination pattern that is other than full illumination of all the area of the front panel that is available to be illuminated.

The illumination pattern may be provided using a light source combined with a pattern generator. The light panel assembly may include a pattern generator configured to produce the pattern. The pattern generator may include a liquid crystal display (LCD), a thin film transistor (TFT) screen, a light-emitting diode (LED) screen, an organic light-emitting diode (OLED) screen, an electroluminescent display (ELD), electronic paper, E Ink, plasma display panel (PDP), and the like. The illumination pattern may include a variable width pattern (e.g., a variable width line pattern), a restricted illumination area pattern, a variable position pattern (e.g., a variable line location pattern), a variable height pattern, a variable line number pattern, a dot illumination pattern, a dot array pattern (including dot matrix pattern), a modulation transfer function estimation pattern or other multi-line pattern, a Gray-code pattern, or combinations thereof.

The light source may be switchable between two or more wavelength spectra, such as switchable between white light, red light, blue light, green light, ultraviolet light (UV), near infrared light (near IR), and infrared light (IR), combinations of the aforementioned, and the like.

In some embodiments, the pattern may include a restricted illumination area pattern that may be useful in reducing the amount of stray light present that may be received by the image capture device, thus improving the signal-to-noise ratio of the characterization apparatus. In such embodiments, the pattern may illuminate only certain portions of the specimen and/or specimen container at the imaging location.

Further, characterization apparatus including pattern generation may be useful for determining an estimate of a concentration or analyte present in the specimen, a scattering property of the specimen, a refractive index property of the specimen, a fluid transmittance of the specimen, turbidity of the specimen, an absorption property of the specimen, whether the specimen includes an interferent, i.e., whether the specimen is lipemic, hemolyic, or icteric (HIL), whether an artifact (e.g., clot, bubble, foam) is present in the specimen, and the like.

In one or more embodiments, characterization apparatus including pattern generation may be useful for quantification of an attribute of the specimen such as a volume or depth of the serum or plasma portion, and/or the volume or depth of the settled blood portion of a fractionated specimen, or both. These values may be used in later processing to determine if sufficient volume of the serum or plasma portion of the specimen are present for the ordered testing, for determining disease state of the patient (e.g., a ratio between the serum or plasma portion and the settled blood portion), and/or for more exact probe (otherwise referred to as a "pipette") tip placement.

Furthermore, according to one or more embodiments, the method and characterization apparatus including a backlight illumination pattern may also be useful for determining a physical property or characteristic of the specimen container. For example, a dimensional characteristic of the specimen container may be determined, such as height and/or width thereof. These dimensional characteristics may be used to properly guide the positioning of the probe during a subsequent aspiration from the specimen container and may be used in the volume calculations, for example. A presence of, or color of, a cap may also be determined.

Furthermore, in some embodiments, the light panel assembly including pattern generation capability may be useful for checking or calibrating operational aspects of hardware of the characterization apparatus.

The specimen, as described herein, is collected in a specimen container, such as a blood collection tube and may include a settled blood portion and a serum and plasma portion after separation (e.g., fractionation using centrifugation). The settled blood portion is made up blood cells such as white blood cells (leukocytes), red blood cells (erythrocytes) and platelets (thrombocytes) which are aggregated and separated from the serum or plasma portion. The settled blood portion is found at the bottom part of the specimen container. The serum or plasma portion is the liquid component of blood that is not part of the settled blood portion. It is found above the settled blood portion. Plasma and serum differ primarily in the content of coagulating components, primarily fibrinogen. Plasma is the un-clotted liquid, whereas serum refers to blood plasma that has been allowed to clot, either under the influence of endogenous enzymes or exogenous components. In some specimen containers, a small gel separator (e.g. plug) may be used, which positions itself between the settled blood portion and the serum or plasma portion during fractionation. It serves as a barrier between the two portions.

In accordance with one or more embodiments, the characterization method may be carried out as a pre-analytical testing or screening method. For example, in one or more embodiments, the characterization method may be carried out "prior to" the specimen being subjected to analysis (clinical chemistry or assaying) on one or more analyzers. In particular, one or more embodiments of the present disclosure may provide for characterization of the specimen as a prerequisite for further testing.

In one or more embodiments, the characterization of the specimen may be carried out at one or more characterization apparatus. The characterization apparatus may be part of a larger laboratory automation system (LAS) that may be configured to move the specimen containers carried in carriers to various locations for pre-characterization (e.g., screening) or for testing and analysis at an analyzer.

In some embodiments, one or more characterization apparatus may be provided as part of the LAS where a track transports the specimen to one or more analyzers, and the one or more characterization apparatus may be provided at any suitable location on, or along, the track. In a specific embodiment, a characterization apparatus may be provided on or adjacent to the track. For example, characterization apparatus may be located at a loading station, or elsewhere along the track, so that the specimen and specimen container can be characterized while residing on the track. However, to be clear, the characterization apparatus including back lighting and pattern generation may not be included on a track and the specimen container including specimen may be loaded and unloaded from the characterization apparatus either manually or by a robot gripper.

In some embodiments, multiple images may be obtained using multiple image capture devices and corresponding light panel assemblies including pattern generation. The multiple image capture devices may be arranged to take the images from different viewpoints arranged about the imaging location. The images may be produced using panelized back illumination including pattern generation for each viewpoint. These multiple images may then be further processed by a computer to generate characterization results and are useful for characterizing specimens where a label may be present on the specimen container so as to occlude some portion of the specimen from some of the viewpoints.

Further details of the inventive characterization apparatus, systems including the characterization apparatus, and characterization methods including pattern generation will be further described with reference to FIGS. 1-9 herein.

Figure 2:
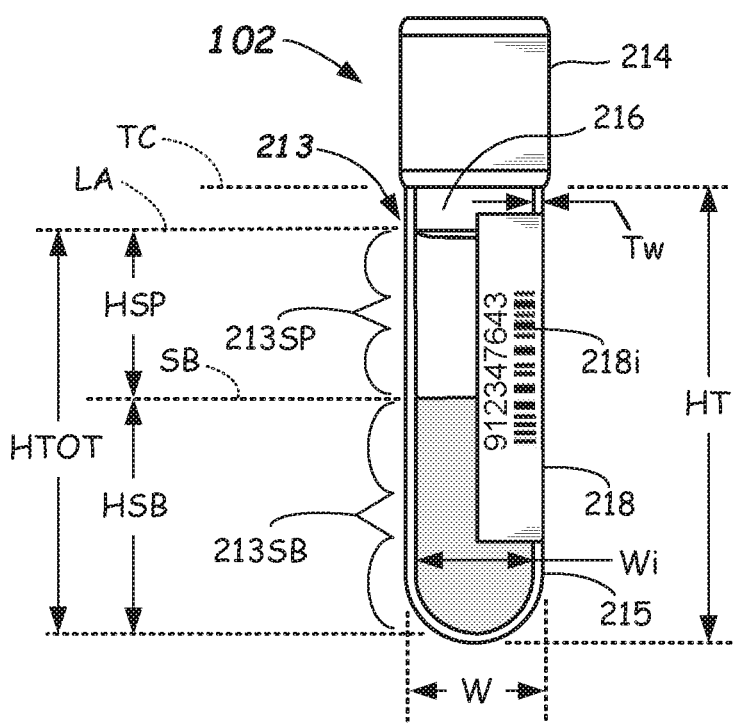
FIG. 2 illustrates a side view of a specimen container including a specimen, one or both of which may be characterized using a method and/or characterization apparatus according to one or more embodiments.
Figure 3:
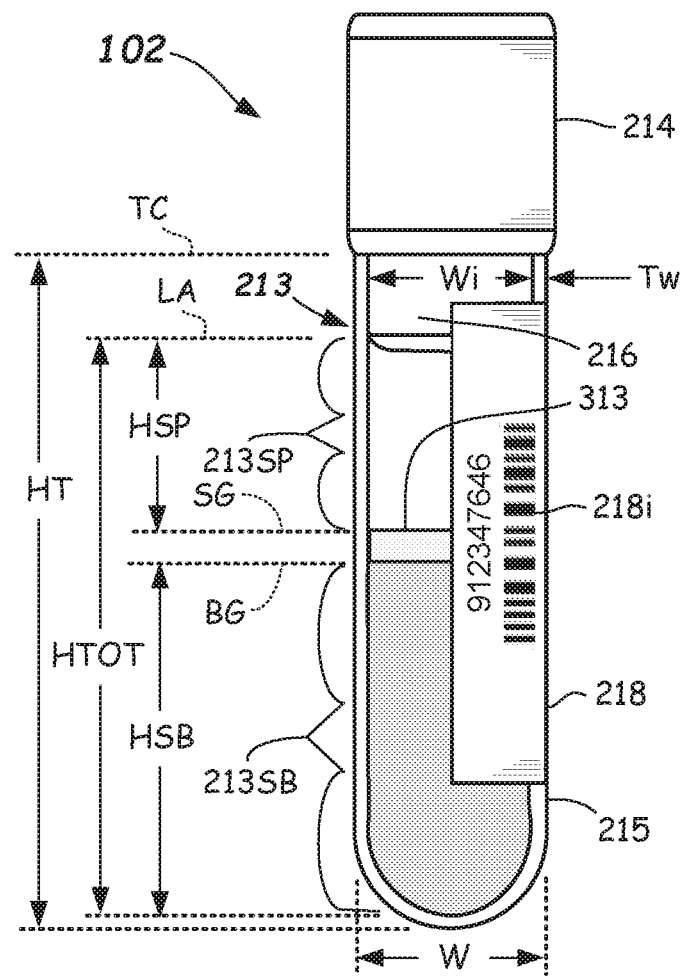
FIG. 3 illustrates a side view of a specimen container including a specimen and a gel separator, one or both of which may be characterized using a method and/or characterization apparatus according to one or more embodiments.

FIG. 1 shows a specimen testing apparatus 100 capable of automatically processing multiple ones of specimen containers 102 (e.g., specimen collection tubes—see FIGS. 2 and 3). The specimen containers 102 may be contained in one or more racks 104 that may be located at a loading area 105 prior to transportation to, and analysis by, one or more analyzers (e.g., first, second, and third analyzer 106, 108, 110, respectively) and/or the characterization apparatus 112. It should be apparent that more or less numbers of analyzers can be used. Likewise, more than one characterization apparatus 112 may be used in the specimen testing apparatus 100.

The analyzers 106, 108, 110 may be any combination of clinical chemistry analyzers and/or assaying instruments, or the like. The specimen containers 102 may be any transparent or translucent container, such as a blood collection tube, test tube, sample cup, cuvette, or other clear or opaque glass or plastic container configured to contain a specimen 213 (See FIGS. 2 and 3).

A specimen 213 to be automatically processed may be provided to the specimen testing apparatus 100 in specimen containers 102, which may be capped with a cap 214 (FIGS. 2 and 3). The cap 214 may have any number of different geometrical shapes and/or colors (e.g., red, royal blue, light blue, green, grey, tan, or yellow, or combinations of colors), which may have meaning in terms of what test the specimen container 102 is used for, the type of additive contained therein, or the like. Other colors may be used. According to one aspect, it may be desirable to image the cap 214 to characterize information about the cap 214 so that it can be used to cross check the type of specimen container 102 with test orders in the system.

Each of the specimen containers 102 may be provided with a label 218 adhered to, or otherwise provided on the side of, the specimen container 102. The label 218 may include identification information 218*i* (i.e., indicia), such as a barcode, alphabetic, numeric, alphanumeric, or combination thereof. Such identification information 218*i* may be machine readable at one or more locations about the specimen testing apparatus 100. The identification information 218*i* may indicate, or may otherwise be correlated, via a Laboratory Information System (LIS) 147, to a patient's identification as well as tests to be accomplished upon the specimen 213, or other information from the LIS system 147, for example. The label 218 may not extend all the way around the specimen container 102, or all along a height of the specimen container 102. In some embodiments, multiple labels 218 may be adhered, and may slightly overlap each other. Accordingly, the label 218 may occlude a view of some portion of the specimen 213. However, some portion of the specimen 213 may still be viewable from certain viewpoints. One or more embodiments of the characterization method and characterization apparatus 112 may enable the characterization of the specimen 213 without any rotation of the specimen container 102.

As best shown in FIGS. 2 and 3, the specimen 213 may include a serum or plasma portion 213SP and a settled blood portion 213SB contained within the tube 215. Air 216 may be provided above the serum and plasma portion 213SP and the line of demarcation between the air 216 and the serum and plasma portion 213SP is defined herein as the liquid-air interface (LA). The line of demarcation between the serum or plasma portion 213SP and the settled blood portion 213SB is defined herein as the serum-blood interface (SB), as is shown in FIG. 2. The interface between the air 216 and the cap 214 is referred to herein as the tube-cap interface (TC). In FIG. 2, the height of the serum or plasma portion 213SP is (HSP) and is measured from the top of the serum or plasma portion 213SP to the top of the settled blood portion 213SB, i.e., from LA to SB. The height of the settled blood portion 213SB is (HSB) and is measured from the bottom of the settled blood portion 213SB to the top of the settled blood portion 213SB. HTOT is the total height of the specimen 213 (i.e., HTOT=HSP+HSB).

In cases where a gel separator 313 is used (see FIG. 3), the height of the serum or plasma portion 213SP (HSP) is measured from the top of the serum or plasma portion 213SP at LA to the top of the gel separator 313 at SG. The height of the settled blood portion 213SB (HSB) is measured from the bottom of the settled blood portion 213SB to the bottom of the gel separator 313 at BG. HTOT in FIG. 3 is the total height of the specimen 213 and is defined as HTOT=HSP+HSB+height of the gel separator 313.

In each case shown in FIGS. 2 and 3, the wall thickness is Tw, the outer width is W, and the inner width of the specimen container 102 is Wi. The height of the tube (HT) is defined herein as the height from the bottom-most part of the tube 215 to the bottom of the cap 214. Each may be characterized according to a characterizing method to be further described herein.

Again referring to FIG. 1, in more detail, specimen testing apparatus 100 may include a base 120 (e.g., a frame or other structure) upon which a track 121 may be mounted or rest. The track 121 may be a railed track (e.g., mono or multiple rail tracks), a collection of conveyor belts, conveyor chains or links, moveable platforms, or any other suitable type of conveyance mechanism. Track 121 may be circular, serpentine, or any other suitable shape and may be a closed track (e.g., endless track) in some embodiments. Track 121 may, in operation, transport individual ones of the specimen containers 102 to destinations spaced about the track 121 in carriers 122 (i.e., specimen container carriers).

The carriers 122 may be passive, non-motored pucks that may be configured to carry a single specimen container 102, where the track 121 is moveable. Optionally, carrier 122 may be automated including an onboard drive motor, such as a linear motor that is programmed to move about the track 121 and stop at pre-programmed locations, wherein in this embodiment, the track 121 is stationary. In either example, the carriers 122 may each include a holder 122H (FIG. 4A) configured to hold the specimen container 102 in a defined position (e.g., upright position). The holder 122H may include multiple fingers or leaf springs that secure the specimen container 102 in the carrier 122. The fingers or leaf springs may move laterally or otherwise flex to accommodate different sizes of specimen containers 102 therein.

Again referring to FIG. 1, in some embodiments, carriers 122 containing specimen containers 102 may exit from the loading area 105 having one or more racks 104 staged thereat. In some embodiments, loading area 105 may serve a dual function of allowing offloading of the specimen containers 102 from the carriers 122 after the analysis thereof at one or more of the analyzers 106, 108, 110 is completed. Otherwise, a suitable offloading lane (not shown) may be provided elsewhere on the track 121.

A robot 124 may be provided at the loading area 105 and may be configured to grasp the specimen containers 102 from the one or more racks 104 and load the specimen containers 102 onto the carriers 122, such as on an input lane or other location of the track 121. Furthermore, robot 124 may also be configured and operable to remove specimen containers 102 from the carriers 122 upon completion of testing. The robot 124 including one or more robot arms or components capable of X and Z, Y and Z, X, Y, and Z, r and theta, or r, theta, and Z motions. Robot 124 may be a gantry robot, an articulated arm robot, an R-theta robot, or other suitable robot wherein the robot 124 may be equipped with robotic gripper fingers that function to grip the specimen containers 102.

Upon being loaded onto track 121, the specimen containers 102 carried by carriers 122 may, in some embodiments, progress to a first pre-processing station 125 (e.g., a centrifuge configured to carry out fractionation of the specimen 213). Carriers 122 carrying specimen containers 102 may be diverted to the first pre-processing station 125 by an inflow lane or a suitable robot (not shown). After being centrifuged, the specimen containers 102 may exit on outflow lane, or otherwise be moved by the robot, and continue on the track 121. In the depicted embodiment, the specimen container 102 in carrier 122 may next be transported to a characterization apparatus 112 in accordance with the disclosure to be further described herein with reference to FIGS. 4A-8.

The characterization apparatus 112 is configured and adapted to characterize the specimen 213 contained in the specimen container 102, as well as configured and adapted to characterize the specimen container 102 in some embodiments. Characterization may include quantification of the specimen 213 at the characterization apparatus 112 and may include determination of physical dimensions of the specimen 213, such as HSP, HSB, and/or HTOT, and/or LA, SB or SG, and/or BG. The characterization apparatus 112 may be configured for determining a one or more of: a scattering property of the specimen 213, a transmittance property of the specimen 213, an absorption property of the specimen 213, a refractive index property of the specimen 213, and/or a fluid turbidity of the specimen 213. The characterization apparatus 112 may be configured for determining a presence of an interferent, such as one or more of hemolysis (H), icterus (I), and/or lipemia (L) contained in a specimen 213. In some embodiments, the characterization apparatus 112 may be configured for determining a presence of an artifact (e.g., clot, bubble, or foam) in the specimen 213.

Moreover, in some embodiments, quantification of the physical attributes of the specimen container 102 may take place at the characterization apparatus 112 such as determining HT, tube outer width (W) and/or tube inner width (Wi), TC, or even cap type or cap color.

Once the specimen 213 and possibly also the specimen container 102 is characterized, the specimen 213 may be forwarded to be analyzed in the one or more analyzers (e.g., first, second and third analyzers 106, 108, and/or 110) before returning each specimen container 102 to the loading area 105 for offloading.

Additionally or optionally, a remote characterization apparatus 112R may be provided at a location remote from the track 121, i.e., not directly linked to the track 121. For instance, a transfer robot 126 (shown dotted) may carry specimen containers 102 containing specimens 213 to the remote characterization apparatus 112R and return them to the track 121 after characterization. Optionally, the specimen containers 102 may be manually removed and returned. Remote characterization apparatus 112R may be used to carry out any of the characterizations discussed above. Furthermore, additional characterization apparatus 112, 112R (not shown) may be arranged around the track 121 at various desirable locations.

The specimen testing apparatus 100 may include sensors 128 at one or more suitable locations around the track 121. Sensors 128 may be used to detect a location of specimen containers 102 along the track 121 by means of reading the identification information 218$i$ (FIGS. 2, 3) or like information (not shown) provided on each carrier 122. In some embodiments, a barcode may be provided on the carrier 122. Optionally, a distinct RFID chip may be embedded in each carrier 122. Barcode readers or RFID readers may be employed in the tracking operation, for example. Other means for tracking the location of the carriers 122 may be used, such as proximity sensors. All of the sensors 128 may interface with the computer 130 so that the location of each specimen container 102 may be known at all times.

Specimen testing apparatus 100 may be controlled by the computer 130, which may be a microprocessor-based central processing unit (CPU), having a suitable memory and suitable conditioning electronics, drivers, and software for operating the various components. Computer 130 may be housed as part of, or separate from, the base 120. The computer 130 may operate to control movement of the carriers 122 to and from the loading area 105, motion about the track 121, and motion to and from the first pre-processing station 125, analyzers 106, 108, 110, and motion to and from the characterization apparatus 112. Computer 130 may also control operation of the characterization apparatus 112. Computer 130 or a separate computer may control operation of the first pre-processing station 125, and each analyzer 106, 108, 110.

For all but the characterization apparatus 112, 112R, the computer 130 may control the specimen testing apparatus 100 according to software, firmware, and/or hardware commands or circuits such as those used on the Dimension® clinical chemistry analyzer sold by Siemens Healthcare Diagnostics Inc. of Tarrytown, N.Y., and such control is typical to those skilled in the art of computer-based electromechanical control programming and will not be further described herein. However, other suitable systems for controlling the specimen testing apparatus 100 may be used. The control of the characterization apparatus 112, 112R may also be provided by the computer 130, as will be described in detail herein.

Embodiments of the present disclosure may be implemented using a computer interface module (CIM) 145 that allows the user to readily access a variety of status and control display screens. These status and control screens may describe some or all aspects of a plurality of interrelated automated devices used for pre-processing, preparation for, and analysis/testing of specimens 213. The CIM 145 may be employed to provide information about the operational status of a plurality of interrelated automated devices, as well as information describing the location of any specimen 213, and/or status of tests on the specimen 213. The CIM 145 may thus be adapted to facilitate interactions between an operator and the specimen testing apparatus 100. The CIM 145 may include a display screen adapted to display a menu including icons, scroll bars, boxes, and buttons through which the operator may interface with the specimen testing apparatus 100 to display functional aspects thereof.

Pre-screening the specimen 213 in accordance with one or more aspects of the disclosure may allow accurate quantification of the relative amounts of the serum or plasma portion 213SP and/or the settled blood portion 213SB, and/or a ratio there between. Furthermore, pre-screening may determine physical vertical locations of LA, SB or SG, and/or a bottom-most part of specimen container 102, the width W of the specimen container 102 or other datum locations. Such quantification ensures that the specimen 213 can be stopped from progressing on to the one or more analyzers 106, 108, 110, if there is insufficient amount (e.g., volume or depth) of serum or plasma portion 213SP available to carry out the ordered tests. In this way, inaccurate test results may be avoided via avoiding the possible aspiration of air.

Advantageously, the ability to accurately quantify the physical location of LA and SB or SG may minimize the possibility of aspirating air, but also may minimize the possibility of aspirating either settled blood portion 213SB or gel separator 313 (if the gel separator 313 is present in the specimen container 102). Thus, clogging and contamination of the specimen aspirating probe used to aspirate serum or plasma portion 213SP for the analyzers 106, 108, 110 may be avoided or minimized in some embodiments.

Figure 4A:
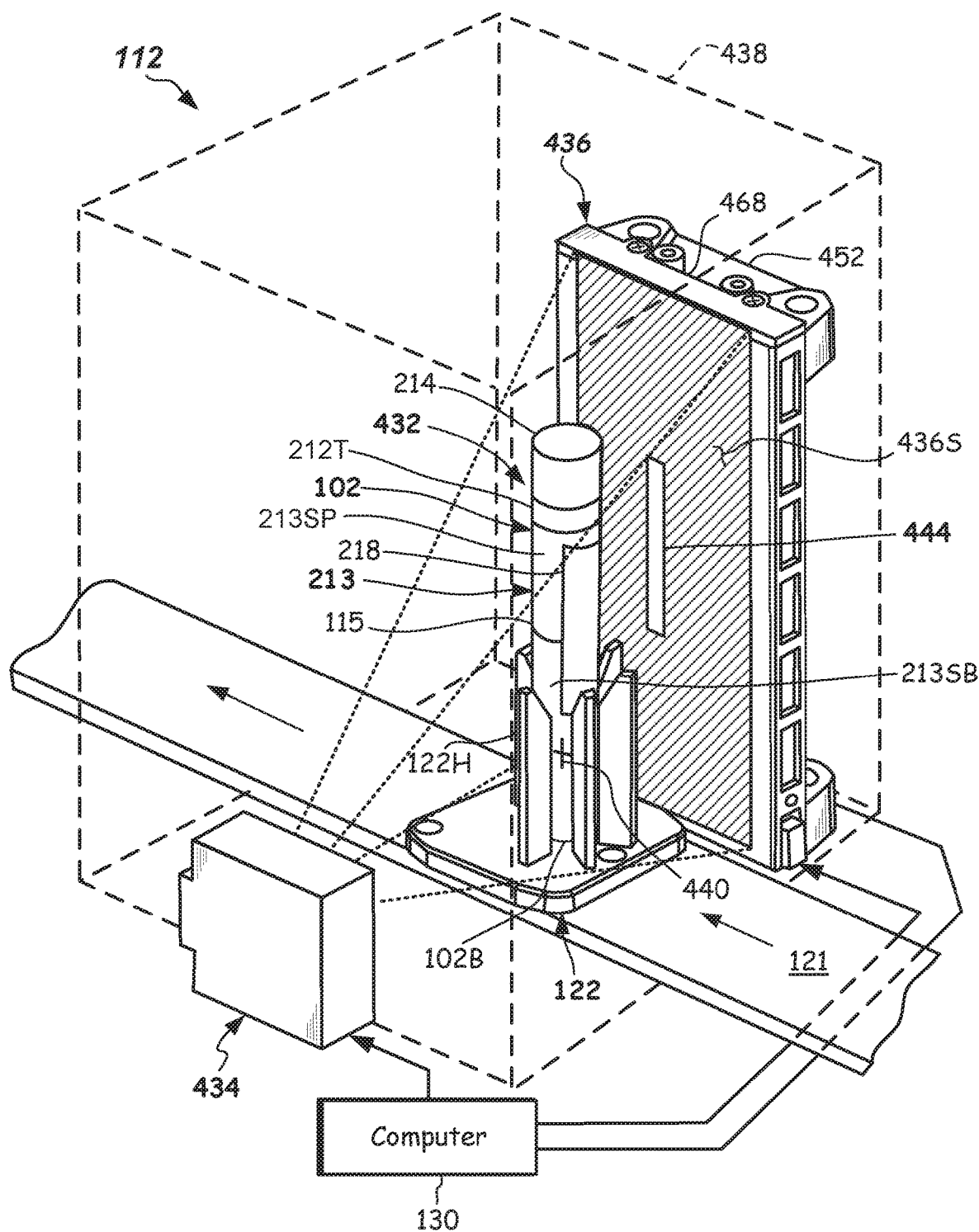
FIG. 4A illustrates an isometric view of a characterization apparatus including a pattern configured to aid in characterizing a specimen and/or specimen container according to one or more embodiments.

Now with reference to FIGS. 4A-4P, descriptions of various embodiments of characterization apparatus 112 including pattern generation capability are provided. The characterization apparatus 112 includes an imaging location 432 configured to receive a specimen container 102 containing a specimen 213 thereat, an image capture device 434 located adjacent to the imaging location 432, and a light panel assembly 436 located adjacent to the imaging location 432. The light panel assembly 436 may be configured to provide lighting of the imaging location (e.g., back lighting), and wherein the light panel assembly 436 is further configured to display a pattern 444 thereon. In the depicted embodiment, the imaging location 432 may be located between the image capture device 434 and the light panel assembly 436. For example, as shown, the light panel assembly 436 is positioned to provide backlighting of the specimen container 102 containing the specimen 213, wherein the illumination provided by the light panel assembly 436 is behind the imaging location 432 when viewed from the perspective of the image capture device 434. Throughout, the hatched portion on the front face 436S are unlit portions of the light panel assembly 436 which define the geometry of the pattern 444.

In the depicted embodiment, the specimen container 102 containing the specimen 213 is held at the imaging location 432 by the carrier 122, wherein the carrier 122 includes a holder 122H, which may include a receptacle, a group of fingers or leaf springs, or any other suitable means for holding the specimen container 102 in a fixed condition in the carrier 122 at the imaging location 432. The carrier 122 and the specimen container 102 containing the specimen 213 may be transported to the imaging location by any suitable device, robot, mechanism, or even manually. In the depicted embodiment, the carrier 122 including the specimen container 102 containing the specimen 213 is transported to the imaging location 432 for image capture on a track 121, as described above.

In some embodiments, the imaging location 432 of the characterization apparatus 112 may be at least partially surrounded by an enclosure 438 (shown dotted in FIG. 4A). The track 121 may run through the enclosure 438, which may include openings at the sides thereof sufficient to let the carrier 122 and specimen container 102 pass into and out of the characterization apparatus 112. The enclosure 438 may be a box-like structure provided to help minimize or eliminate outside lighting variances.

In one or more embodiments, the image capture device 434 may be digital camera capable of capturing a digital image (i.e., a digital pixelated image). However, in some embodiments, the image capture device 434 may be a charged coupled device (CCD), an array of photodetectors, one or more CMOS sensors, or the like. The image capture device 434, in this embodiment, may be configured to take one or images of the specimen container 102 and specimen 213 at the imaging location 432 from a single lateral viewpoint. The image capture device 434 may be capable of taking a digital image having an image size that may be approximately 2560 pixels×694 pixels. In another embodiment, the image capture device 434 may have an image size of 1280 pixels×384 pixels. Other suitable pixel densities and sizes may be used.

The image capture device 434 may be provided in close proximity to, and trained or focused to capture an image window at an imaging location 432 including an expected location of the specimen container 102. In some embodiments, the specimen container 102 may be placed at or stopped at the imaging location 432, such as by stopping on a track 121, so that the specimen 213 is approximately located in a center of the image window. Otherwise, the specimen container 102 may be being placed at the imaging location 441 by a robot or manually. As configured, the image capture device 434 can generate one or more images that include portions of the serum or plasma portion 213SP, portions of the settled blood portion 213SB, some of the cap 214, a bottom-most portion 102B of the tube 115, and/or a reference datum 440, for example. The reference datum 440 may aid in quantification of the specimen 213 and determining a vertical location of the specimen container 102 within the optical view window. Reference datum 440 may be a visible mark or marks (e.g., one or more crosses, ring surrounding the specimen container 102, or the like) placed on the specimen container 102 in a known vertical location, for example, that can be viewed regardless of the rotational orientation of the specimen container 102 in the holder 122H of the carrier 122.

Figure 4B:
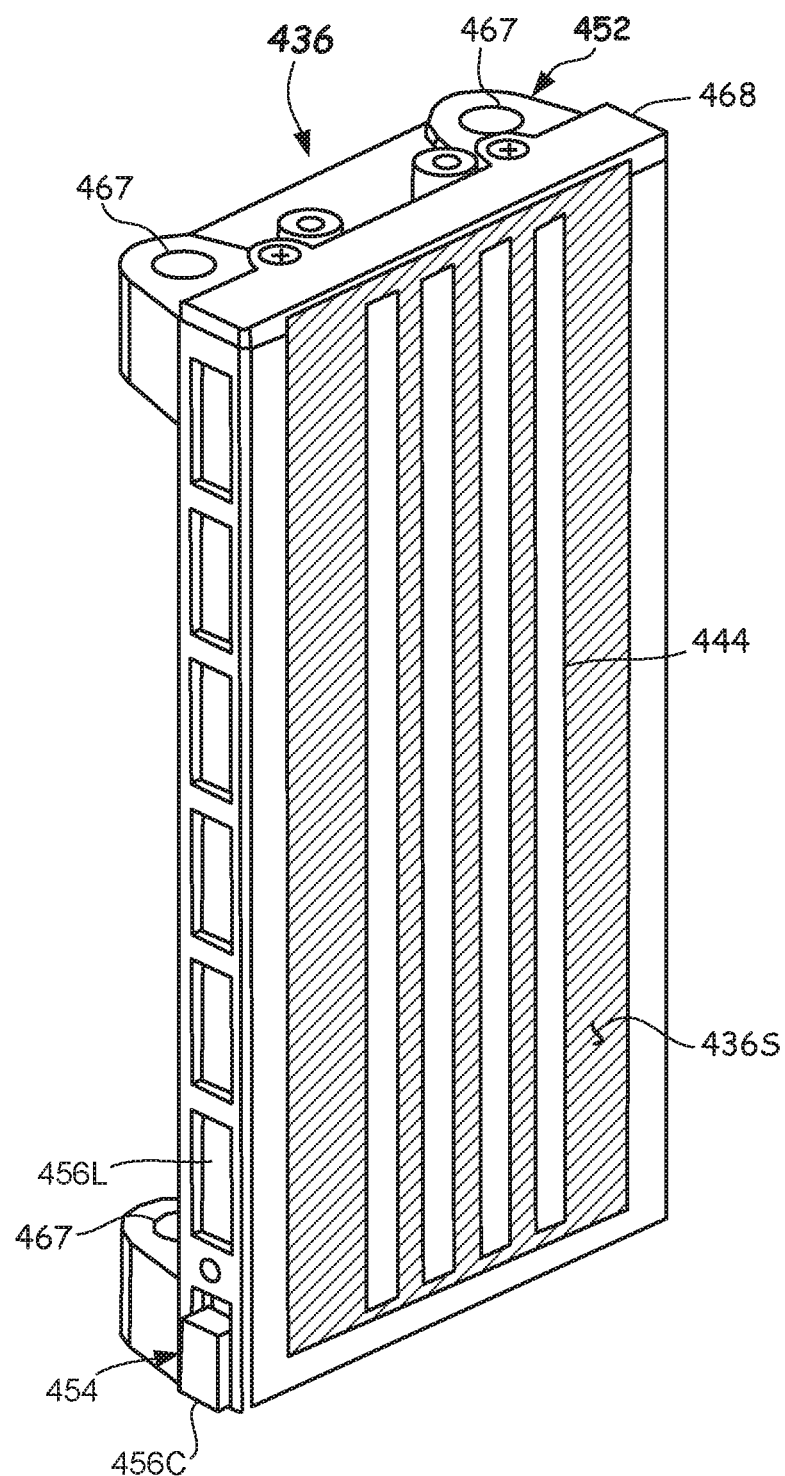
FIG. 4B illustrates an isometric view of a light panel assembly configured to generate a pattern according to one or more embodiments.
Figure 4D:
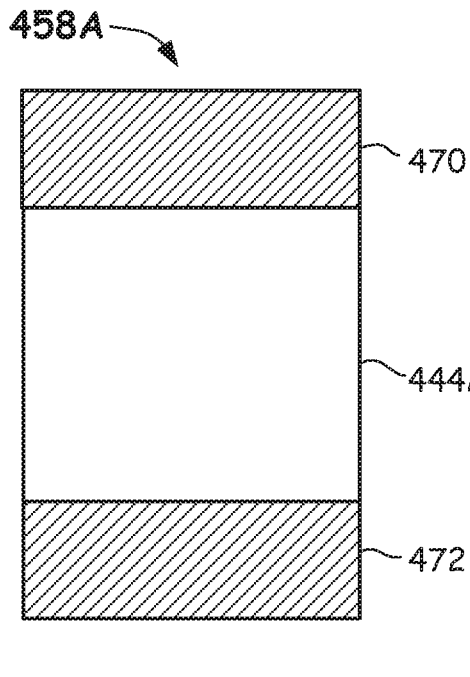
FIG. 4D illustrates a front view of a first pattern displayable on a front face of a light panel assembly comprising restricted illumination where less than all of the area is illuminated that is capable of being illuminated according to one or more embodiments.

Referring now to FIGS. 4A-4C, details of an example embodiment of a light panel assembly 436 of the characterization apparatus 112 are described. The light panel assembly 436 may include a frame 452 including a first side and a second side, and a light source 454 coupled to, mounted on, or associated with the frame 452. The light source 454 is operational to cause light emission from a front surface 436S of the light panel assembly 436. In the depicted embodiment, the light source 454 may comprise a plurality of individual light sources (e.g., first, second, and third individual light elements 460, 461, 462) that may be arranged (e.g., vertically) along the first side and the second side of the frame 452. The individual light elements 460, 461, 462 may be assembled as light arrays 454L, 454R that emit light into the lateral edges 456L, 456R (e.g., the side edges) of a light guide 456 as best shown in FIG. 4C and as will be described below. The light guide 456 may be positioned adjacent to the plurality of plurality of individual light elements 460, 461, 462.

The light panel assembly 436 is further configured to display a pattern 444 on the front surface 436S thereof. The pattern 444 may be generated by a pattern generator 458 that may be mounted in the frame 452, for example. The pattern generator 458 may be positioned in front of the light source 454. The pattern generator 458 may be a liquid crystal display (LCD) screen, a thin film transistor (TFT) screen, a light-emitting diode (LED) screen, or an organic light-emitting diode (OLED) screen, an electroluminescent display (ELD), electronic paper, E Ink, plasma display panel (POP), or other suitable device or mechanism that is configured and capable of producing an discernable pattern 444 in the illumination field of the light source 454. The pattern 444 may be switched from one pattern to another (i.e., is switchable) to facilitate different types of tests.

The pattern 444 may be any suitable pattern wherein less than all of the area that is capable of being illuminated on the front surface 436S is, in fact, illuminated. The pattern 444 may be the part that is illuminated. The pattern 444 may be any suitable pattern that is useful for improving the imaging at the imaging location 432, for running a particular test protocol, or even for calibration of the image capture device 434. The pattern 444 may be selected from the group of patterns including: a variable width pattern, a restricted illumination area pattern, a variable position pattern, a variable height pattern, a variable line number pattern, a dot illumination pattern, a dot array pattern, a modulation transfer function estimation pattern, a Gray-code pattern, and combinations thereof, all of which are explained in more detail herein.

In some embodiments, the light source may be used in conjunction with the light guide 456. The light guide 456 may be made of a suitably transparent light guide material including light diffusing capability, such as provided by a plastic sheet including internal light diffusing particles or other means of internal light diffusion. One suitable material is Acrylite LED® EndLighten, a product available from Evonik Industries AG of Essen, Germany. The light guide 456 may be made of a sheet having a width of between about 60 mm and about 150 mm, a height of between about 120 mm and 180 mm, and a thickness of between about 3 mm and about 5 mm, for example. Other suitable sizes may be used.

As best shown in FIG. 4C, the light guide 456 functions by guiding light emitted laterally into the lateral edges 456L, 456R thereof by light arrays 454R, 454L (e.g., LED strip modules) of the light source 454 through the bulk material of the light guide 456 and emitting light on the front surface 456F and rear surface 456R of the light guide 456 due to light interactions with the light diffusing particles therein. In some embodiments, the back surface of the light guide 454 may include a highly-reflective material formed thereon to reflect or backscatter any light transmission passing towards the back surface 456B and direct it back into the bulk material of the light guide 456 so that it may then be emitted from the front surface 456F. Optionally, a highly-reflective material may be provided on the back surface 457A of the frame 452 or as an individual element between the frame 452 and the light guide 456. The highly-reflective material may be provided as a mirror or a white plastic element, or other plastic or glass element with a metallic coating of silver, gold, chrome, tin, or combinations, for example. The light emitted from the front surface 456F may be radiated substantially uniformly across the entire surface of the light guide 456 and in conjunction with pattern generator 458 provided a patterned illumination of the specimen container 102 and specimen 213.

In more detail, the light source 454 may include the light arrays 454L, 454R arranged adjacent to the lateral edges 456L, 456R of the light guide 456. The light arrays 454L, 454R may be LED strip modules including a linear array of individual light source elements (e.g., light emitting diodes—LEDs) arranged linearly along the lateral edges 456L, 456R of the light guide 456. The light arrays 454L, 454R each may include a plurality of LEDs, such as between about 8 and 80 LEDs, for example that may be arranged on a circuit board. Other numbers of individual light sources may be used. Connectors 456C may be provided to allow electrical connection of the light source 454 to the computer 130 (FIGS. 1 and 4A). The light arrays 454L, 454R may be provided along the respective sides of a pocket 457 and are configured such that the emitting portion of each of the light sources (e.g., LEDs) are provided directly adjacent to the lateral edges 456L, 456R, and even touching the lateral edges 456L, 456R, if possible.

In some embodiments, the light source 454 of the light panel assembly 436 may be spectrally-switchable. The light source 454 may be switchable between two or more wavelength spectra of light. For example, the light source 454 may be switchable between two or more of white light, red light, green light, blue light, ultraviolet light, near infrared light, and/or infrared light. In some embodiments, the light arrays 454L, 454R may provide for the switchable multi-spectral illumination. For example, the light arrays 454L, 454R may include a plurality of independently switchable lighting elements, or lighting elements that may be switchable in groups, such as LEDs that have different light emission spectra. The switching of the lighting elements (e.g., light elements 460-462) may be accomplished by software operable on the computer 130 coupled with an appropriate power source and drivers. Thus, the light panel assembly 436 may be illuminated at multiple different wavelength spectra having different nominal wavelengths by selecting some of the lighting elements for illumination at a time.

For example, the light panel assembly 436 may emit red light, green light, and blue light (estimated to include red (R) spectra at 634 nm+/−35 nm, green (G) spectra at 537 nm+/−35 nm and blue (B) spectra at 455 nm+/−35 nm), for example. In particular, the light arrays 454L, 454R may include clusters of R, G & B LEDs as the light elements 460, 461, 462 that may be arranged in a repeating pattern along the height of the light arrays 454L, 454R. High power Oslon SSL model LEDs available from Osram Opto Semiconductors GmbH of Regensburg, Germany may be used, for example. Other suitable LED light sources may be used. Each of the same-colored LEDs may be illuminated at once. For example, each or the red spectra LEDs may be turned on simultaneously to provide red spectral illumination from the light panel assembly 436 to illuminate the specimen container 102 containing specimen 213 during imaging by the image capture device 434. Likewise, each of the green spectra LEDs may be turned on simultaneously to provide green spectral illumination during imaging. Similarly, each of the blue spectra LEDs may be turned on simultaneously to provide blue spectral illumination during imaging. It should be recognized that R, G, and B are examples, and that other wavelength spectra light sources may be used (e.g., white, infrared, near infrared, UV). Thus, it should be apparent that the light panel assembly 436 can be configured as a switchable, multi-spectral light emitter so that the pattern 444 may be illuminated at one or more spectra.

In some embodiments, some of the lighting elements may include white light sources that emit white light spectra (e.g., wavelength range of about 400 nm to about 700 nm) for certain types of imaging. In other embodiments, ultra violet (UV) spectra (wavelength range of about 10 nm to about 400 nm), infra-red (IR) (wavelength range of 700 nm to 1 mm) or near infra-red (near IR) (wavelength range of about 700 nm to about 2500 nm) may be included and may be switched on at times for certain types of imaging. For example, a sequential combination of light at wavelength shorter and longer than 580 nm (or in reverse order) may be useful in detecting hemolysis in a serum or plasma portion 213SP of a specimen 213. In another example, a sequential combination of light at wavelength shorter and longer than 500 nm (or in reverse order) may be useful in detecting icterus in a serum or plasma portion 213SP of a specimen 213. In another example, near-infrared light spectra may be useful in detecting a level of the settled blood portion 213SB and/or level of serum or plasma portion 213SP and/or volume of the settled blood portion 213SB and/or serum or plasma portion 213SP of a specimen 213 despite occlusion by a label 218 from a particular viewpoint.

Thus, one or more embodiments of light panel assembly 436 may include at least two switchable lighting elements having different emission spectra. In some embodiments, switchable R, G and B lighting elements are provided. In some embodiments, switchable R, G, B, and white lighting elements are provided. In yet other embodiments, switchable R, G, B, and UV lighting elements are provided. In yet other embodiments, switchable R, G, B, and infrared or near-infrared lighting elements are provided. Any combination of two or more of switchable R, G, B, white, UV, infrared and near-infrared lighting elements may be provided in the light panel assembly 436. In some embodiments, the combination of switchable lighting elements may be provided in equal amounts and may be evenly spaced along the height of the light guide 456.

The light panel assembly 436 may optionally include a diffuser 459 including diffusing properties and may be provided as a sheet of diffuser material, such as a sheet of Acrylite® Satince available from EVONIK of Essen, Germany, for example. Other suitable diffuser materials may be used. The diffuser 459 may be positioned in front of the pattern generator 458. The diffuser 459 may be a sheet having height and width dimensions approximately the same as the light guide 456 and a thickness of between about 2 mm and about 4 mm, for example. Other thicknesses may be used. The diffuser 459 functions by scattering light passing through it. The diffuser 459 and the light guide 456 may be provided in spaced relationship to one another with a slight gap formed there between. The gap may be, for example, between about 1 mm and about 5 mm in some embodiments. Other gaps and dimensions may be used.

Some embodiments of the light panel assembly 436 may include a mask 464 to provide a uniformly-sized field of light. The mask 464 may include a frame-like blocking element that defines the maximum extent of the illumination field emitted from the light panel assembly 436. In some embodiments, a front panel 465 of a transparent sheet material may be provided to protect the other components. The front panel 465 may be a transparent sheet of plastic or display glass, for example. The mask 464 may be positioned in front of the pattern generator 458 in some embodiments. The front panel 465 may be provided in front of the mask 464.

In some embodiments, a diffuser sheet may be attached directly to the pattern generator 458, thereby replacing or in addition to the light diffusion function of diffuser 459. The diffuser sheet may be, for example, a sheet of MAKROFOL® LM309 by Covestro of Leverkusen, Germany. In some embodiments, a protective sheet may be attached directly to the pattern generator 458, replacing or adding to the protective functionality of front panel 465. The protective sheet may be a sheet of ADQC27 from 3M of St. Paul, Minn., USA, for example.

The frame 452 may be made of a rigid material, such as plastic, and may include suitable fastening structures, such as bores 467 that are adapted to be mounted onto fixed mounting rods (not shown). Other suitable mounting features may be included for mounting the light panel assembly 436 in a fixed orientation to the imaging location 432. Frame 452 may include the pocket 457 that may include an open front and open top and a closed back surface 457A and closed bottom 457B and that is configured to receive and position the light source 454, light guide 456, pattern generator 458, and the diffuser 459 (if used), the mask 464 (if used), and the front panel 465 (if used) therein. The various components may be inserted into the pocket 457 from the top and secured in place with securement member 468 in some embodiments. Other suitable means for securing the components to the frame 452 may be used.

Figure 4E:
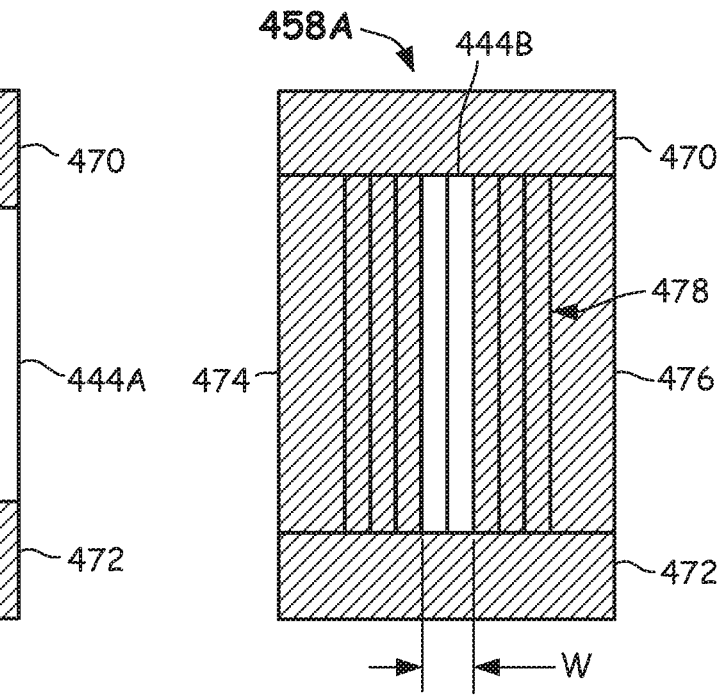
FIG. 4E illustrates a second pattern option that can be displayable on a front face of a light panel assembly including a pattern comprising restricted illumination where less than all of the area is illuminated that is capable of being illuminated and the area of restricted illumination can be changed in width according to one or more embodiments.
Figure 4F:
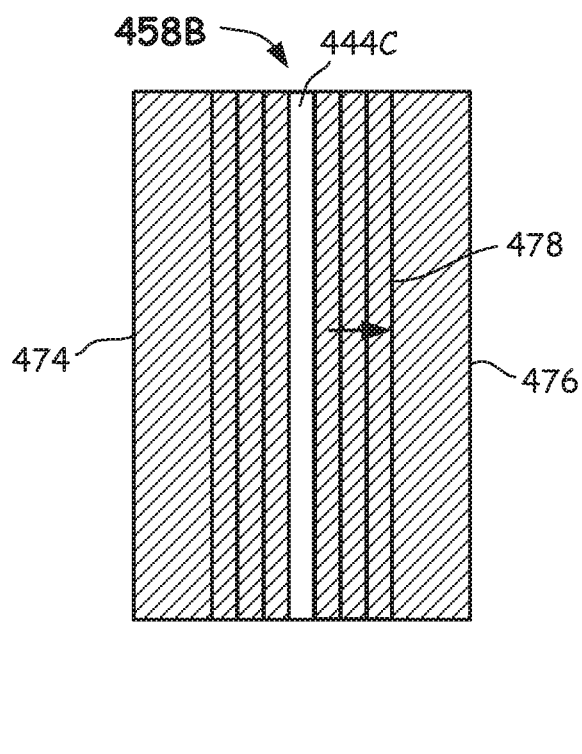
FIGS. 4F and 4G illustrates a third pattern option that can be displayable on a front face of a light panel assembly where the area of restricted illumination can be moved laterally (e.g., repositionable on the front face either left or right) in FIG. 4F by a distance D as compared to the FIG. 4E pattern according to one or more embodiments.
Figure 4G:
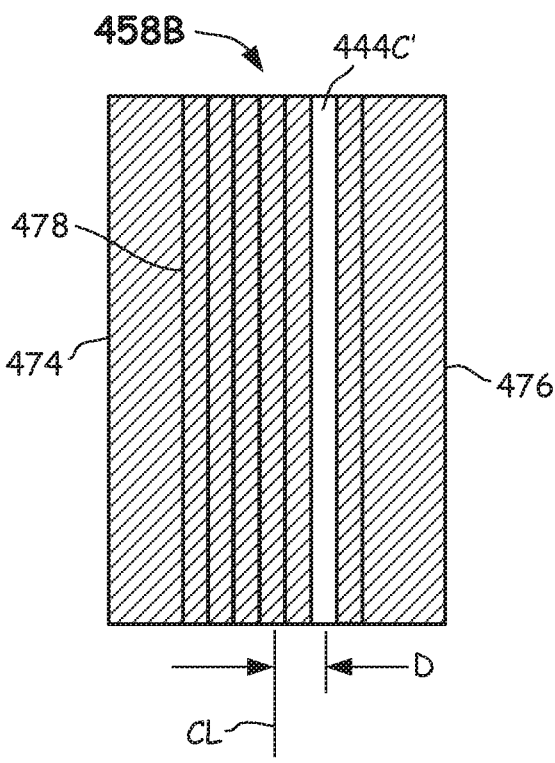
Figures 4H, 4I:
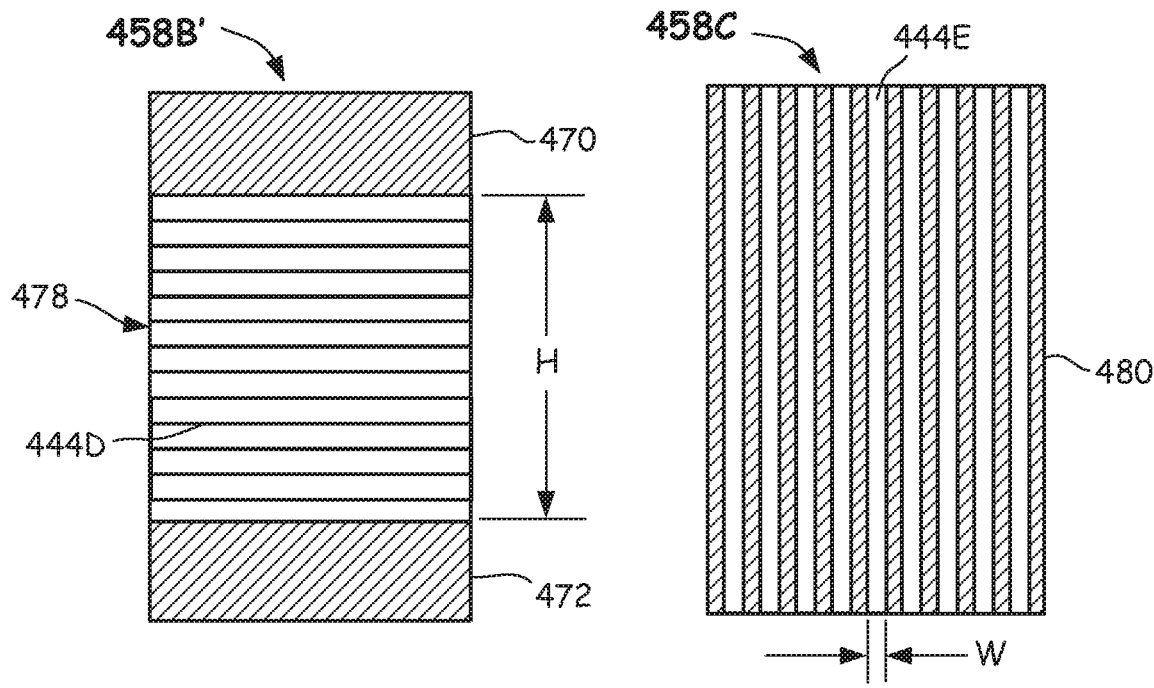
FIG. 4H illustrates a fourth pattern option that is displayable on a front face of a light panel assembly including a pattern comprising restricted illumination where the area of restricted illumination can be enlarged or made smaller in area (e.g., by changing a height H of the pattern) according to one or more embodiments.
FIG. 4I illustrates a fifth pattern option that is displayable on a front face of a light panel assembly including a pattern comprising a modulation transfer function estimation pattern where a plurality of illuminated strips can be enlarged or made smaller in area (e.g., by changing a width W of the pattern) according to one or more embodiments.
Figures 4J, 4K:
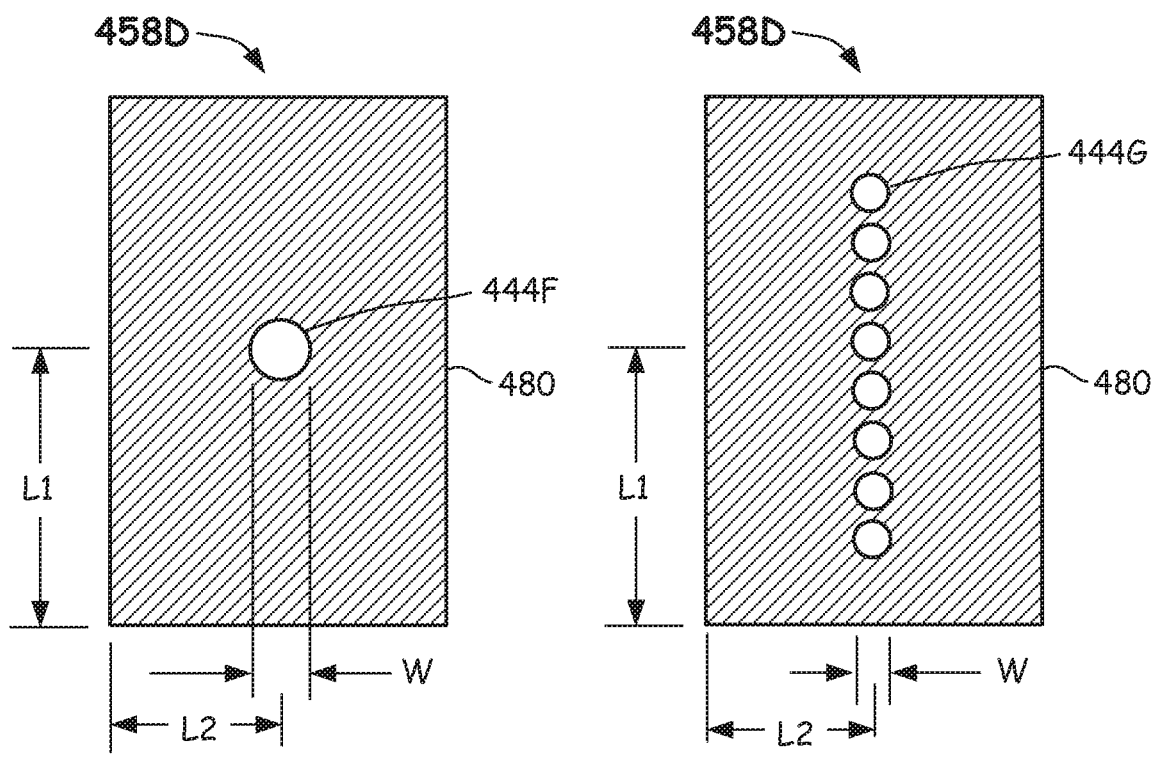
FIG. 4J illustrates a sixth pattern option that is displayable on a front face of a light panel assembly including a pattern comprising restricted illumination where the area of restricted illumination (e.g., a dot pattern) can be enlarged or made smaller in area (e.g., by changing a width W of the pattern) and/or changed in location L1, L2 according to one or more embodiments.
FIG. 4K illustrates a seventh pattern option that is displayable on a front face of a light panel assembly including a pattern comprising restricted illumination where a dot matrix pattern that can be changed in size and/or position is provided according to one or more embodiments.
Figures 5A, 5B:
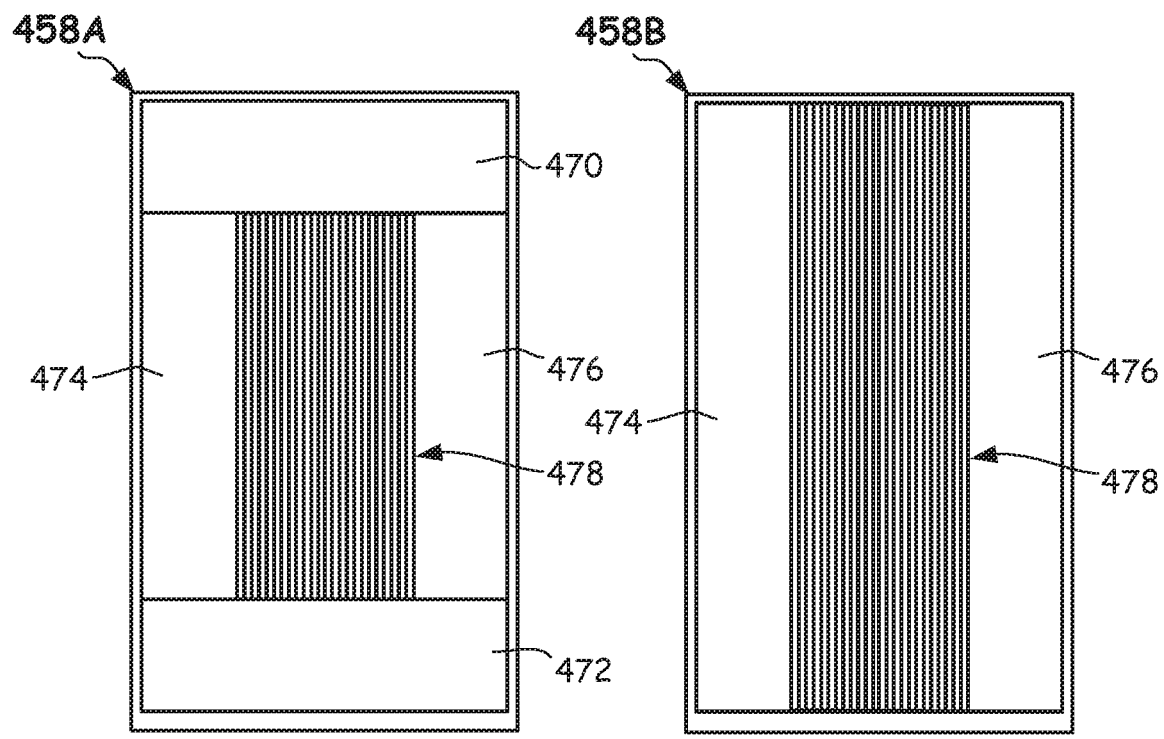
FIG. 5A-5D illustrates front views of various embodiments of pattern generators according to one or more embodiments.
Figures 5C, 5D:
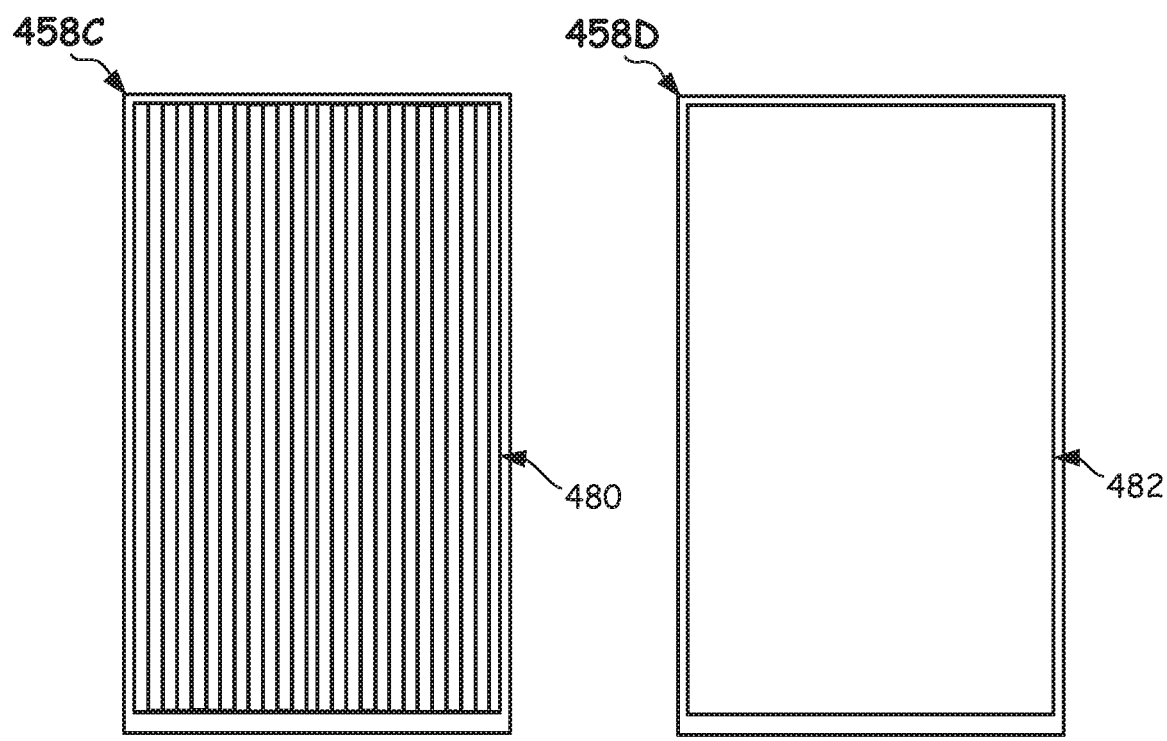

FIG. 5A illustrates a first embodiment of a pattern generator 458A that can be used to generate various patterns 444 (e.g., FIGS. 4A, 4B, and FIGS. 4D-4O) to be displayed on the front surface 436S of the light panel assembly 436. The pattern generator 458A may be a multi-segmented LCD display panel including an upper segment 470 and a lower segment 472 that can be independently controlled to block out light emission from regions associated with the upper segment 470 and a lower segment 472. For example, the pattern 444A shown in FIG. 4D may be generated by blocking upper segments 470 and lower segments 472 via activating those respective regions of the LCD. This may be used to restrict illumination by emitting lighting only onto the middle vertical region of the imaging location 432, such as to allow light emissions onto the expected locations of the serum or plasma portion 213SP of the specimen 213, for example. As such, lighting above and below the specimen 213 may be restricted.

Likewise, the pattern generator 458A may include a left segment 474 and a right segment 476 that can be independently controlled. The left segment 474 and a right segment 476 may be controlled to block out light emission from regions associated with the left segment 474 and a right segment 476. This may be used to minimize stray lateral light within the enclosure 438 that may make its way to the image capture device 434 and thus provide improved signal-to-noise ratio. For example, the specimen container 102 containing a specimen 213 and at least the front surface 436S of the light panel assembly 436 may be included in the enclosure 438, and wherein the pattern 444 may be a restricted illumination area pattern operating to reduce an amount of lateral stray light within the enclosure 438.

The pattern generator 458A may include multiple center segments 478 that can be independently controlled to block out light emission from various regions associated with the center segment 478. For example, the pattern 444B shown in FIG. 4E may be generated by blocking light emissions from upper and lower segments 470, 472, from the left segment 474 and the right segment 476, and from some of the center segments 478. As such, the pattern 444B may include a width W that can be adjusted from a maximum width to a minimum width. The pattern 444B including variable width W may be used for determining fluid transmittance property of the serum or plasma portion 213SP, determining fluid scattering property of the serum or plasma portion 213SP, and/or determining a refractive index property of the serum or plasma portion 213SP. For example, the width W may be varied between about 1 mm and 100 mm. The width W may be varied in increments of about 0.5 mm, for example. Other widths W and increments may be used. Moreover, the variable width pattern 444B may be used as a restricted illumination mode that may avoid or minimize emission of light into lateral regions for a specific test with the purpose of reducing a level of undesired lateral stray light within the enclosure 438.

FIG. 5B illustrates another embodiment of a pattern generator 458B that can be used to generate various patterns 444 (e.g., FIG. 4F-4H). The pattern generator 458B may also be a multi-segment LCD display panel, but includes only a left segment 474, a right segment 476, and multiple center segments 478 that can be independently controlled to block out light emission from the various associated regions. For example, the patterns 444C, 444C' shown in FIGS. 4F and 4G can be generated by blocking out light from the left segment 474, the right segment 476, and some of the center segments 478. As shown, the pattern 444C' as shown in FIG. 4G may be shifted in position (e.g., laterally) by a distance D from the centerline CL of the pattern generator 4586. This ability to shift a position of the pattern 444C' (a variable position pattern) on the pattern generator 4586 may be used to compensate for positioning tolerances of the specimen container 102 at the imaging location 432, for example. Moreover, the ability to shift the pattern 444C' may provide enhanced information content in some embodiments.

Additional patterns, such as the pattern 444D shown in FIG. 4H may be generated by a pattern generator 458', like pattern generator 4586, but with the center segment 478 rotated ninety degrees and used for analysis of one or more attributes of the specimen 213 and/or of the specimen container 102. In this embodiment, the height H of the pattern 444D may be changed from a narrowest extent to a widest extent (a variable height pattern). The degree of change of height H possible may be dependent on the designed heights of the upper and lower segments 470, 472 and the line resolution capability of the center segment 478 of the pattern generator 4586'.

The pattern 444D including variable height H may be used for determining fluid transmittance property of the serum or plasma portion 213SP or determining fluid scattering property of the serum or plasma portion 213SP. The height H may be varied between about 1 mm and 200 mm in some embodiments, for example. The height H may be varied in increments of about 0.5 mm, for example. Other heights H and increments may be used. Moreover, the variable height pattern 444D may be used in a restricted illumination mode that may avoid or minimize emission of light into certain regions for a specific test with the purpose of reducing a level of undesired vertical stray light within the enclosure 438.

Additional patterns, such as the pattern 444E shown in FIG. 4I may be generated by the pattern generator 458C (FIG. 5C) and used for analysis of one or more attributes of the specimen 213 and/or of the specimen container 102. In this embodiment, the width W of the illuminated lines (variable width pattern) as well as the number of lines in the pattern 444E (variable line number pattern) may be changed. Thus, in one embodiment, a pattern 444E is shown consisting of nine illuminated lines. This pattern 444E may be changed by blocking out more or less of the vertical segments 480 from the pattern generator 458C. Thus, patterns including one to about twenty or more illuminated lines, or a number of lines per mm may be generated. Thus, subsequent patterns may be generated having more or less lines than the last-displayed pattern 444E may be displayed on the light panel assembly 436. Such modulation transfer functions (MTF) may be used to estimate fluid turbidity, for example.

FIGS. 4J and 4K illustrate various dot patterns 444F and 444G that may be displayed on the pattern generator 458D. Pattern generator 458D may be an LCD, LED, OLED, TFT, an electroluminescent display (ELD), electronic paper, E Ink, plasma display panel (PDP), or any other display screen where any pattern, such as dot pattern 444F, and dot array pattern (including a dot matrix pattern) 444G may be displayed. The pattern is based on illuminating multiple pixel locations of the pattern generator 458D. The vertical location L1 from a bottom edge of the pattern generator 458D and/or a lateral position L2 of the pattern (e.g., dot pattern 444F or dot array pattern 444G) may be adjusted. In some embodiments, the width dimension W (e.g., diameter of each dot) of the dot pattern 444F or dot array pattern 444G may be adjusted. Moreover, other patterns may be generated other than dot patterns. It should be recognized that, because of the versatility of LCD, LED, OLED, TFT, ELD, electronic paper, E Ink, and PDP screens, any desirable pattern shape may be generated, including the previously described patterns 444A-444E. The use of dot patterns may be used to estimate a fluid transmittance property, a fluid scattering property, and/or a fluid refractive index property of the serum or plasma portion 213SP of the specimen 213, for example.

FIGS. 4L-4O illustrates additional patterns 444H-444K that may be generated by the pattern generator 458C, for example. These patterns 444H-444K may be Gray-code patterns that may be used in a sequence (e.g., a 4-bit sequence), for example. These patterns may be used for spatial encoding of light emitting regions of the light panel assembly 436. Each pixel of the image capture device 434 may observe on the front surface 436S, a bit sequence representing the originating region with no or a little ambiguity. Each of these patterns 444H-444K may be imaged by the image capture device 434. The purpose of such encoding is to trace the propagation of light from the origin (the patterns 444H-444K) through the specimen container 102 and specimen 213 and to the image capture device 434, revealing disturbances along the optical path. Such disturbances contain information on the optical characteristics of the specimen 213 and specimen container 102, as well as on occlusions that are present, such as barcode labels, for example. The Gray-code sequence may also be used to self-test the operation of the hardware and connections (e.g., operability of the light panel assembly 436, image capture device 434, and computer 130, connections, and the like).

Figure 6:
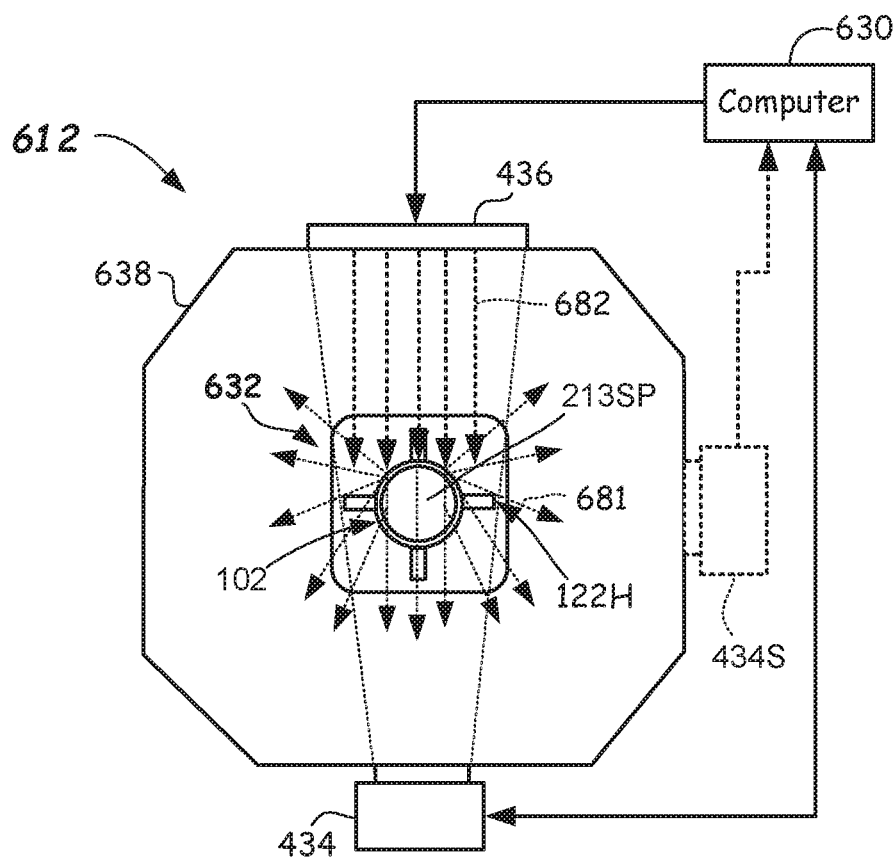
FIG. 6 illustrates a top schematic view (with ceiling removed) of a characterization apparatus including a light panel assembly capable of generating and capturing an image of a pattern according to one or more embodiments.

Another embodiment of a characterization apparatus 612 including a light panel assembly 436 is shown and described with reference to FIG. 6. Characterization apparatus 612 may be configured and adapted to automatically characterize and/or quantify a scattering property of the serum or plasma portion 213SP that is provided in specimen container 102 held by a holder 122H located at the imaging location 632. The imaging location 632 may be at least partially surrounded by an enclosure 638. Characterization apparatus 612 may include an image capture device 434, as described above, that is configured to capture and record in memory one or more images of the serum or plasma portion 213SP from a single lateral viewpoint. As described previously, a light panel assembly 436 may provide backlighting and an illumination pattern, such as any one of the patterns 444B, 444C, 444D, 444F, 444G shown respectively in FIGS. 4E, 4F, 4H, 4J, and 4K. Light from the respective pattern passes into and/or through the serum or plasma portion 213SP. If the serum or plasma portion 213SP is a clear fluid, it is subject to refraction at the interfaces of air, fluid, and specimen container 102, but a large percentage will pass through to the image capture device 434. In case of a turbid fluid (e.g., one which may be lipemic, for example), scattering inside the fluid volume of the serum or plasma portion 213SP has a further effect on the propagation of light. In particular, the scattering effect can be viewed as statistical light diffusion, spreading out the direction of light (shown as scattered rays 681) vs. the original direction of travel (shown as original rays 682). The light intensity due to the scattering may be captured by the image capture device 434 and recorded in memory of computer 630. The captured intensity may be measured and compared to a baseline reading, such as a calibration reading with a specimen fluid having known scattering properties taken earlier. Thus, the extent of scattering may be categorized from a minim to a maximum value. Optionally, or additionally, the light intensity due to the scattering may be captured by a side image capture device 434S and recorded in memory of computer 630. The intensity values obtained from the side image capture device 434S may be used to provide a measure of extent of scattering from a minim to a maximum value. The values obtained from the side image capture device 434S may be used alone or in combination with the measurements captured by the image capture device 434 to define an extend of the scattering property.

In other embodiments, an estimate of a scattering property may be provided by comparing the observed intensity at the image capture device 434 of a small vs. a large aperture illumination pattern as backlighting. A small aperture illumination, for example a dot source (FIG. 4J) or narrow line (FIG. 4E) illumination behind the specimen container 102, will be subject to diffusion within the serum or plasma portion 213SP is turbid (e.g., lipemic) and show less intensity than viewed without the fluid in the optical path. "Turbidity" is a word describing how light passes through a sample liquid as a measure of how many particles are suspended in that liquid. A large aperture illumination pattern of equal intensity per square mm will also be subject to diffusion of the serum or plasma portion 213SP is turbid, but the loss in intensity will be lower. The diffusion effect is partially eliminated by light gathered from a larger solid angle of the tube 215 with the large aperture illumination pattern. As a result, the turbid fluid appears to "light up" in the large aperture illumination, whereas the same turbid fluid appears to "dilute" the narrow aperture illumination. This effect can be measured in a normalized form by computing the transmittance ratio. The transmittance ratio may be observed using a wide vs. narrow illumination pattern and may be characterized in accordance with equation 1 below.

$$TB = T\_wide / T\_narrow \qquad \text{Eqn. 1}$$

where TB is a unitless measure of turbidity,
T_wide is a transmittance reading obtained with a relatively wide illumination pattern, and
T_narrow is a transmittance readings obtained with a relatively narrow illumination pattern.

The scattering property measurement may optionally involve using dark and/or spectral reference images and may use multi-exposure HDR processing as is described in commonly-assigned U.S. Provisional Patent Application 62/288,387 filed on Jan. 28, 2016, and entitled "METHODS AND APPARATUS FOR IMAGING A SPECIMEN CONTAINER AND/OR SPECIMEN." The measurement and computation may be preferably performed on a global basis, but also pixel or superpixel-wise (i.e. spatially discrete) computation is possible. Any dimension changeable pattern (e.g., height changeable and or width changeable pattern) may be used. Suitable patterns are shown in FIG. 4E (e.g., width changeable line pattern 444B), FIG. 4H (e.g., height changeable line pattern 444D), and the diameter changeable patterns, such as dot pattern 444F and dot array pattern 444G shown in FIGS. 4J and 4K, respectively. In some embodiments, the ratio of light source extent may be maximized to provide maximum contrast. Width ratios (WR=W wide/W narrow) of greater than 1 may be used. Some embodiments include WR≥5, or even WR between about 5-20.

The information obtained by the characterization apparatus 112, 612 described herein may allow for precise aspiration probe and gripper positioning, determination that a sufficient amount (e.g., volume or height) of the liquid portion (e.g., serum or plasma portion 213SP) is available for the tests ordered, identification of a degree of Hemolysis (H), Icterus (I), or Lipemia (L), and/or determining the presence of an artifact (clot, bubble, or foam). Thus, using the characterization apparatus 112, 612 may help avoiding gripper crashes, probe clogging, and air aspiration by the probe, identifying HIL, and/or an artifact, such that valuable analyzer resources are not wasted and that confidence in the test results may be improved.

Figure 7A:
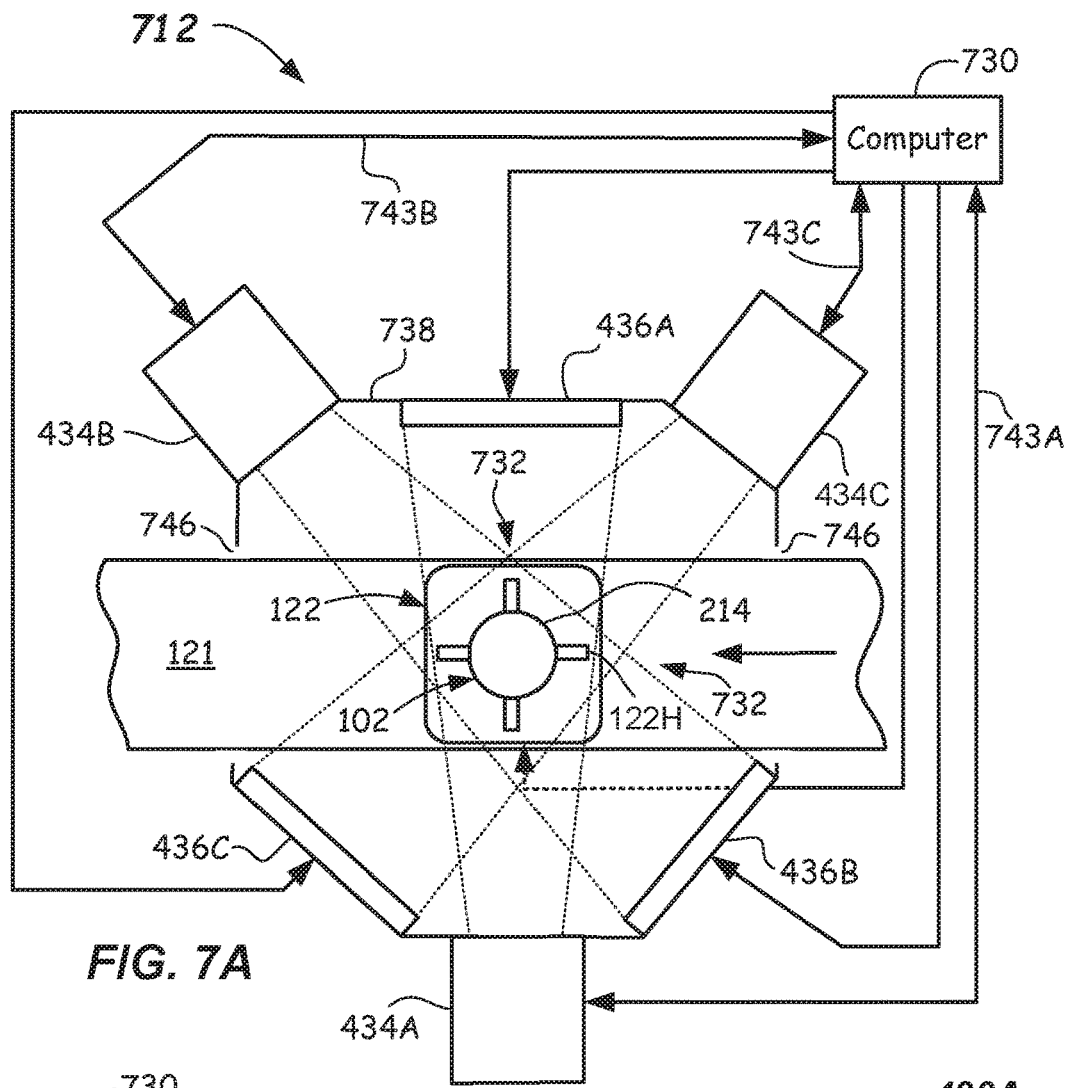
FIG. 7A illustrates a top schematic view (with ceiling removed) of a characterization apparatus including multiple light panel assemblies each capable of generating and capturing an image of a pattern according to one or more embodiments.
Figure 7B:
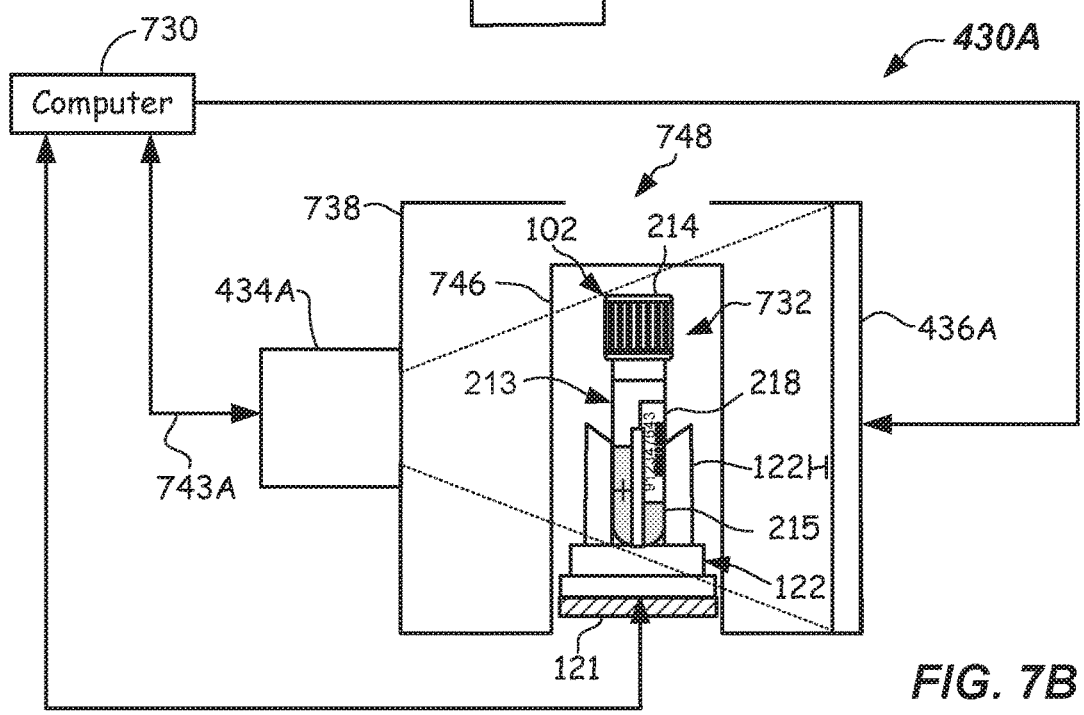
FIG. 7B illustrates a side view of a characterization apparatus including an illumination panel apparatus capable of generating and capturing an image of a pattern according to one or more embodiments.

With reference to FIGS. 7A and 7B, a characterization apparatus 712 including multiple image capture devices 434A-434C and light panel assemblies 436A-436C including pattern illumination capability are shown. However, other numbers of pairs of image capture devices and light panel assemblies may be used, such as two, or four or more. To minimize edge distortion, three or more image capture devices 434A-434C may be used. Image capture devices 434A-434C may be the same as discussed above. For example, three image capture devices 434A-434C are illustrated in top view in FIG. 7A, with ceiling removed for illustration purposes and are configured to take images from multiple (e.g., three) different lateral viewpoints. Each image capture device 434A-434C may be capable of taking a digital image having a pixel image size as discussed above, for example. In some instances, processing of the images by computer 730 may be by processing superpixels (rather than pixels) to lower computational burden. Pixel as used herein may be a single pixel or a superpixel (collection of closely-grouped multiple pixels).

Each image capture device 434A-434C may be configured and operable to take multiple lateral images of at least a portion of the specimen container 102 and at least a portion of the specimen 213 (e.g., the serum or plasma portion 213SP and/or the settled blood portion 213SB). For example, the image capture devices 434A-434C may capture a part of the label 218 or cap 214, part of the tube 215, and the specimen 213 (see FIGS. 2-3). From the multiple images, 2D data sets may be generated by each image capture device 434A-434C and stored in memory in the computer 730. From these 2D data sets, a composite model of the specimen 213 in the specimen container 102 can be developed. The composite model may be a 3D model in some embodiments, and may be used to make final determinations about the specimen 213, or to confirm determinations made by using the 2D data from the images taken by the individual image capture device 434A-434C.

In the embodiment shown, the plurality of image capture devices 434A-434C are arranged around the imaging location 732 and configured to capture lateral images of the imaging location 732 from the multiple viewpoints. The viewpoints may be spaced so that they are approximately equally spaced from one another, such as about 120 degrees from one another, as shown, when three image capture devices 434A-434C are used. As depicted, the image capture devices 434A-434C may be arranged around the edges of the track 121. Other arrangements and spacing of the plurality of image capture device 434A-434C may be used. In this way, the images of the specimen 213 in the specimen container 102 may be taken while the specimen container 102 is residing in the holder 122H of the carrier 122. The images may overlap slightly in some embodiments.

In one or more embodiments, the carrier 122 may be stopped at a predetermined location in the characterization apparatus 712, such as at a point where normal vectors from each image capture device 434A-434C intersect with each other. This stopping point may be at the imaging location 732. In some embodiments, a gate may be provided to stop the carrier 122, so that good quality images may be taken. In other embodiments, the carrier 122 may include a linear motor configured to stop the carrier 122 at described locations, as programmed, and to move the carrier 122 to the next station on the track 121 after imaging. In an embodiment where there is a gate at the characterization apparatus 712, the one or more sensors (like sensors 128—FIG. 1) may be used to determine the presence of a carrier 122 at the characterization apparatus 712.

The image capture devices 434A-434C may be provided in close proximity to and trained or focused to capture an image window, i.e., an imaging location 732 including an expected location of the specimen container 102, wherein the specimen container 102 may be stopped so that it is approximately located in a center of the view window. As configured, the characterization apparatus 712 can capture images that include portions of the serum or plasma portion 213SP, portions of the settled blood portion 213SB, some or all of the cap 214, and a bottom-most portion 215B of the tube 215 or a reference datum 440, as backlighted by light panel assemblies 436A-436C. Reference may be made to TC, the bottom-most portion 215B of the specimen container 102, or to the reference datum 440 (e.g., a visible mark placed on the specimen container 102 in a known location), for example.

In operation, each image may be triggered and captured responsive to a triggering signal send by the computer 730 and provided in communication lines 743A-743C when the computer 730 receives a signal that the carrier 122 is located at a certain location in the characterization apparatus 712. Each of the captured images may be processed according to one or more embodiments of the method disclosed herein. In one or more embodiments, HDR image processing may be used to capture and process the images in order to characterize the specimen 213 and specimen container 102 with a high level of detail and informational content.

In more detail, multiple images may be captured of the specimen 213 (e.g., previously separated by fractionation) at the characterization apparatus 712 at multiple different exposures times, at multiple different wavelengths (or one or more wavelength ranges), and from different viewpoints. For example, each image capture device 434A-434C may take 4-8 images at different exposure times and at multiple wavelengths. Other numbers of images may be used. Any suitable pattern 444 may be displayed on the light panel assemblies 436A-436C during the imaging, such as the patterns shown in FIGS. 4A, 4B, and 4D-4O.

In one embodiment, the images may be accomplished while being back illuminated by using the light panel assemblies 436A-436C that include a light source 454 that may be spectrally-switchable, as described above. In some embodiments, light panel assemblies 436A-436C may back light the specimen container 102 and specimen 213 with white light between 400 nm and 700 nm, for example. However, the light source 454 may be switchable to one or more other spectra, such as R, B, G, UV, IR, and/or near IR. Thus, in each embodiment, the light source 454 including spectrally-switchable capability may provide back illumination at multiple selected emission spectra. A suitable pattern 444 may be used for illumination of each image, depending on the attribute to be analyzed. The capture and use of the multiple spectrally-illuminated images may increase the information content for analysis and may emphasize certain characteristic absorption spectra when imaging at a specific wavelength spectra.

For example, to capture images with illumination at a first spectra, light element 460 (e.g., red LEDs) of each of the light panel assemblies 436A-436C (nominal wavelength of about 634 nm+/−35 nm) may be used to illuminate the specimen 213 from three lateral locations. The red illumination by the light panel assemblies 436A-436C may be provided as the multiple images (e.g., 4-8 or more images) at different exposure times are captured by each image capture device 434A-434C. In some embodiments, the exposure times may be between about 0.1 ms and 256 ms. Other exposure times may be used. Each of the respective exposure time images being illuminated with red light for each image capture device 434A-434C may be taken simultaneously and stored in memory in computer 730.

Once the red illuminated images are captured, the red light elements 460 (e.g., red LEDs) may be turned off and another wavelength of light, for example, green light elements 461 (e.g., green LEDs) may be turned on (nominal wavelength of about 537 nm+/−35 nm), and multiple images (e.g., 4-8 or more images) at different exposure times may be captured at that wavelength by each image capture device 434A-434C. This may be repeated with light elements 462 (blue LEDs—nominal wavelength of about 455 nm+/−35 nm) for each image capture device 434A-434C.

In yet other embodiments, the light panel assemblies 436A-436C may include a light source matrix of individual light sources (e.g., R, G, and B LEDs) provided behind the pattern generator 458, each of which may be individually switchable or switchable in spectral color groups. Thus, different colored lighting (e.g., R, G, B and/or a multitude of other spectra) can be selectively turned on and off, for example, to illuminate the imaging location 732 at multiple different wavelength spectra.

The characterization apparatus 712 may include an enclosure 738 that may at least partially surround or cover the track 121, and the specimen container 102 may be located inside the enclosure 738 during the image capture phase. Enclosure 738 may include one or more doors 746 to allow the carriers 122 to enter into and/or exit from the enclosure 738. In some embodiments, the ceiling may include an opening 448 (FIG. 7B) to allow a specimen container 102 to be loaded into the carrier 122 by a robot (not shown) including a gripper adapted to grasp the specimen container 102.

In an alternate embodiment, it is possible to achieve multiple illumination modes that may be desirable for different types of characterizations by focusing on transmissive imaging, absorbance imaging, or reflective imaging. For example, in some embodiments the imaging location 732 may optionally include front lighting illumination in addition to the backlighting provided by the light panel assemblies 436A-436C.

According to one or more embodiments, all three light panel assemblies 436A-436C may be operable to display patterns 444 and act as back lighting sources for imaging by the all three image capture devices 434A-434C. The imaging may be transmissive imaging such as for an absorbance or a scattering property measurement, such as for HIL detection, artifact detection (e.g., detection of foam, clot or bubble), segmentation, turbidity analysis, or for determining refractive index.

For each of the above setups, all of these multiple images taken at multiple exposure times for each respective spectra (e.g., R, G, B, white light, UV, IR, or near IR) may be obtained in rapid succession, such that the entire collection of images for the specimen 213 from multiple viewpoints may be obtained in less than a few seconds, for example. Other lengths of time may be used.

According to a method of processing the image data, the processing of the image data may first involve, for example, selection of optimally-exposed pixels from the image data of the multiple captured images at the different exposure times and at each spectra, and for each image capture device 434A-434C (if multiple devices are used), so as to generate optimally-exposed image data for each spectra (e.g., RGB colored images) and for each image capture device 434A-434C. This is referred to as "image consolidation" herein. For each corresponding pixel, for each of the images from each viewpoint, pixels exhibiting optimal image intensity may be selected from each of the different exposure time images. In one embodiment, optimal image intensity may be pixels that fall within a predetermined range (e.g., between 180-230 on a scale of 0-255), for example. In another embodiment, optimal image intensity may be between 16-254 on a scale of 0-255, for example. If more than one pixel in the corresponding locations of two images (from one image capture device) is determined to be optimally exposed, the higher intensity of the two is selected. Each of the optimally-exposed intensity values may be normalized by its respective exposure time. The result is a plurality of normalized and consolidated 2D color image data sets (e.g., R, G, B) for each viewpoint where all of the pixels are optimally exposed (e.g., one image data set per spectra (e.g., R, G, and B) and viewpoint.

As part of the characterization method, a calibration process of the characterization apparatus 112, 612, 712 may commence where reference images without a specimen container 102 in the carrier 122 may be taken. In this way, computational burden may be minimized by removal of the background (the region outside of the specimen container 102) from each 2D image data set. One or more reference images for each exposure time and lighting condition (R, G, B, white light, UV, IR, or near IR) may be taken by the characterization apparatus 112, 612, 712 before (or after) carrying out the characterization/quantification. These reference images may be taken in some embodiments by displaying a pattern, such as pattern 444E on the light panel assembly 436 (or 436A, B, C if multiple viewpoints). Optionally, a Gray-code sequence as in patterns 444H-444K (or some subset thereof) may be used for calibration images. Moreover, the one or more reference images may be used for self-testing of the hardware of the characterization apparatus 112, 612, 712.

For each 2D image data set including optimally-exposed pixels, a segmentation process may then be undertaken to generate one 2D consolidated image and identify a class for each pixel (or superpixel) therein for each viewpoint. For example, the pixels may be classified as serum or plasma portion 213SP, settled blood portion 213SB, gel separator 313 (if present), air 216, tube 215, label 218, holder 122H, or cap 214. Classification may be based upon a multi-class classifier generated from multiple training sets. The multi-class classifier may comprise a support vector machine (SVM) or a random decision tree, for example.

To carry out the pixel-level classification, first statistical data may be computed for each of the optimally-exposed pixels at the different nominal wavelengths (e.g., R, G, B, white light, UV, IR or near IR) for each viewpoint to generate 2D statistical data sets. The 2D statistical data sets may include mean values and covariance. Other statistics may be generated. The statistical data may include attributes up to second order, which include mean values, variation, and correlation values. In particular, the covariance matrix is computed over multidimensional data representing discriminative patterns.

Once generated, each 2D statistical data set is presented to, and operated on, by the multi-class classifier operable on computer 130, 630, 730, which may classify the pixels in the image data sets as belonging to one of a plurality of class labels, such as including 1—serum or plasma portion, 2—settled blood portion, 3—gel separator (if used), 4—air, 5—tube, 6—label, 7—holder, and/or 8—cap. From this, the pixels making up the liquid region (i.e., the serum and plasma portion 213SP) as well as the other regions may be identified. The result of the segmentation is consolidated 2D data sets, one data set for each viewpoint where all the pixels therein are now classified.

The multi-class classifier may be any suitable type of supervised classification model that is linear or non-linear. For example, the multi-class classifier may be a support vector machine (SVM) that is either linear or kernel-based. Optionally, the multi-class classifier may be a boosting classifier such as an adaptive boosting classifier (e.g., AdaBoost, LogitBoost, or the like), any artificial neural network, a tree-based classifier (e.g., decision tree, random decision forests), and logistic regression as a classifier, or the like. A SVM may be particularly effective for classification between liquids and non-liquids, such as found in the analysis of the specimen 213 and specimen container 102. A SVM is a supervised learning model with associated learning algorithms that analyzes data and recognizes patterns. SVMs are used for classification and regression analysis.

Multiple sets of training examples are used to train the multi-class classifier, and then the image data sets are operated on by the multi-class classifier and each pixel is classified as a result. The multi-class classifier may be trained by graphically outlining various regions in a multitude of examples of specimen containers 102 having various specimen conditions, occlusion by label 218, levels of serum or plasma portion 213SP and settled blood portion 213SB, containing gel separator 313 or not, and the like. As many as 500 or more images may be used for training the multi-class classifier. Each training image may be outlined manually to identify and teach the multi-class classifier the areas that belong to each class.

An SVM training algorithm may be used to build the multi-class classifier that assigns pixels of any new specimen into one of the classes. The SVM model represents examples as points in space that are mapped so that the examples of the separate classes are divided by a clear gap that is as wide as possible. New pixels from the image data sets may be mapped into that same space and predicted to belong to a particular class based on where they fall on the map. In some embodiments, SVMs can efficiently perform a non-linear classification using what is called a kernel trick (e.g., kernel-based SVM classifier), implicitly mapping their inputs into high-dimensional feature spaces. SVM, tree-based classifiers, and boosting are particularly preferred. Other types of multi-class classifiers may be used.

The results of the multi-class classifier that are deemed to be of the class serum or plasma portion 213SP and/or settled blood portion 213SB may then be used to further quantify the specimen 213.

Characterization may take place according to a characterization method according to one or more embodiments. First, the specimen container 102 including specimen 213, which may be carried by carrier 122, may be provided at the characterization apparatus 112, 612, 712. Multiple images may be captured with the image capture device 434 or image capture devices 434A-434C. The multiple images may be, in some embodiments, multi-spectral images taken at multiple different exposures and at multiple different spectra, and may be at one or more viewpoints, as described above.

Figure 8:
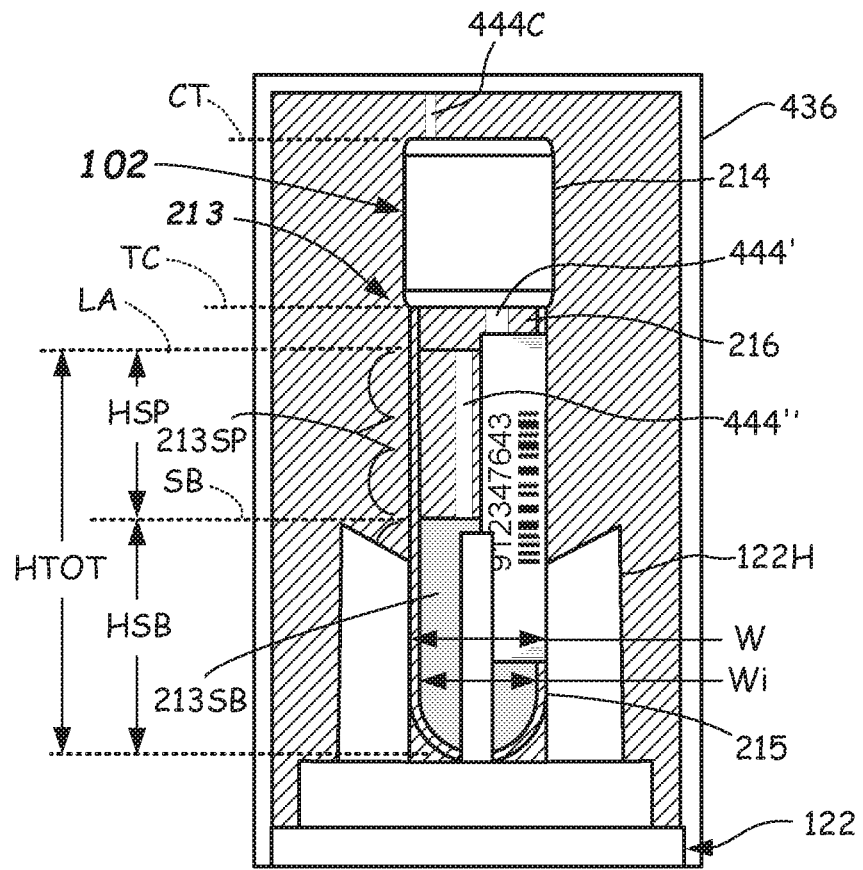
FIG. 8 illustrates a side view of a characterization apparatus including an illumination panel apparatus generating a pattern and a refraction of that pattern according to one or more embodiments.

Quantification of the specimen container 102 and/or specimen 213, in some embodiments, may be accomplished by utilizing edge shift due to refraction. For example, a lateral shift of an edge of the pattern (e.g., pattern 444C) displayed on the light panel assembly 436, as imaged through the specimen container 102 in the region containing air 216 between tube cap interface TC and the liquid air interface LA, can be detected. For example, as shown in FIG. 8, due to refraction of the pattern 444C in the area between the tube cap interface TC and the liquid air interface LA, a refracted pattern 444' having a different width and location as compared to pattern 444C displayed on the light panel assembly 436 is produced and may be imaged. For example, the pattern 444' may be made wider and moved laterally by a distance, as shown. The degree of change in width and/or location can be correlated to the width Wi of the specimen container 102. Moreover, the location of the tube cap interface TC and the liquid air interface LA may be determined by analyzing patterns 444C, 444', and 444". The disappearance of the pattern 444 in the image at the cap top CT location of the cap 214 indicates that a cap is present and also the height of the cap 214. TC may be determined by calculating the position of pixels associated with the tope of pattern 444' in the image.

Quantification of the specimen 213, and, in particular, the height HSP of the serum or plasma portion 213SP may be accomplished by imaging the refracted pattern 444" through the serum or plasma portion 213SP. Because of the change in the location of the pattern 444" and the blocking of the pattern 444 by the settled blood portion 213SB because of its opaqueness, the height of the pattern 444" may be extracted from the image and be used to generate an estimate of HSP, but also the location of the liquid air interface LA (at location of top of pattern 444") and location of the serum blood interface SB (location of bottom of pattern 444"). HSB may be determined by knowing the location of the seated bottom of the tube 215 in the holder 122H. In some cases, a detected edge shift of the pattern 444C carries information on the refractive index of the fluid, as well as the curvature of the specimen container. A similar approach may compute the magnification factor of an illumination pattern 444C (e.g., via imaging at least 2 contrast edges of the pattern through the specimen 213 and specimen container 102), making use of the "lens effect" observed when light passes a curved surface at the interface of different refractive indices.

The illuminated setup of the characterization apparatus 112, 612, 712 including a displayed pattern 444 may be used for detecting an interferent and/or detecting an artifact in the specimen 213, and specifically in the serum or plasma portion 213SP. In each case, the multiple images taken may be stored in memory of the computer 130, 630, 730. From these images, the background may optionally be removed in a background reduction phase to lower computational burden. Background removal may be optionally accomplished by subtracting reference images previously taken. A normalization of the data as between the various viewpoints (if multiple viewpoints) may be undertaken in some embodiments.

After image capture, and optional background removal, segmentation may be undertaken. The segmentation may include image consolidation. During image consolidation, the various exposure time images at each color (R, G, B, white light, UV, IR, or near IR) and for each viewpoint are reviewed pixel-by-pixel (or superpixel by superpixel) to determine those that have been optimally exposed, as compared to a standard (described above). For each corresponding pixel location of the exposure time images for each viewpoint, the best of any optimally-exposed pixel is selected for each color and viewpoint and included in an optimally-exposed 2D image data set. Thus, following image consolidation, there is produced one optimally-exposed 2D image data set for each spectrum and for each viewpoint and for each image capture device 434 or image capture device 434A-434C). The use of HDR processing may function to enrich the details of the images, especially with respect to reflection and absorption and this make characterization and quantification more accurate.

Following image consolidation possibly concurrent therewith, statistics generation may be undertaken, where statistical attributes up to second order are generated for each pixel, such as mean and covariance. This statistical data and the optimally-exposed 2D data sets are then operated on by the multi-class classifier to identify the pixel classes present in the images data sets. For each superpixel location a statistical description is extracted within a small patch (e.g. a superpixel of 11×11 pixels). Each patch provides a descriptor, which is considered in the evaluation process. The classifiers may operate on feature descriptors and use output class labels during testing/evaluation. The final class for each superpixel may be determined by maximizing confidence values for each superpixel. The calculated statistical values encode specific properties of classes and are thus used for discrimination between different classes. From this segmentation, a consolidated 2D image data set is generated for each of the viewpoints, wherein each pixel in the consolidated image data set is given a classification as one of a plurality of class types described above. From this segmentation, a 3D model may be generated and constructed from the consolidated 2D image data sets. The 3D model may be used to ensure a result that is consistent among the various viewpoints if multiple image capture device 434A-434C are used.

According to another method, the liquid region (e.g., the serum or plasma portion 213SP) may be characterized. This may involve grouping all the pixels from class—serum or plasma portion 213SP, and then determining a location of the upper interface between liquid (serum or plasma portion 213SP) and air 216 (i.e., LA) for the consolidated 2D image data sets. This may be done for each viewpoint. A numerical value for LA may be calculated for each of the consolidated 2D image data sets by averaging the locations of the uppermost pixels that were classified as serum or plasma portion 213SP for each viewpoint. Any substantial outliers may be rejected and not used in the average. Previously performed pixel space to machine space (e.g., in mm) calibration may be accomplished by any known machine space to image space calibration technique and may be used to convert pixel space to machine space useable by the robot for gripping or by other robots used for aspiration. The liquid/air interface LA may otherwise be determined or cross checked using refraction method discussed above. These numerical values for LA for each viewpoint (if more than one viewpoint) can be aggregated to identify a final value of LA that may be used in the 3D model. The aggregation may be by any suitable method to fuse the respective results of the viewpoints, such as by averaging the numerical values for LA for each of the viewpoints, for example. If one value is substantially below the other two, it may be discarded as an outlier.

Depending on whether a gel separator 313 is present (e.g., used), the characterization method then may determine the location of SB or SG (if gel separator is present) for each viewpoint based on pixels classified by the model as settled blood portion 213SB or gel separator 313. A numerical value for SB or SG for each viewpoint may be calculated by averaging or aggregating the locations of the lowermost pixels classified as serum or plasma portion 213SP. A single value for SB or SG may be determined for the 3D model by averaging the SB or SG values for the viewpoints. From the locations of LA and SB or SG, the height of the serum or plasma portion HSP (FIGS. 2 and 3) may be determined via subtraction of the averages for LA and SB or SG. This height HSP may be cross checked or otherwise provided by the refractive index method discussed above.

Quantifying the liquid region (e.g., the serum or plasma portion 213SP) may further include determining an inner width (Wi) of the specimen container 102. In some embodiments, the outer width (W) may be determined by the refractive index method described above, or by identifying the pixels that are classified as tube 215 for each consolidated 2D image data set and subtracting the locations of corresponding ones of the pixels that are located on the lateral outside edges of the tube 215 (for example, as measured between LA and SB or SG), and then averaging the subtracted values for each viewpoint. A final value of W may be determined by averaging the W values from the viewpoints. Substantial outliers may be ignored. Wi may be determined from W by subtracting twice the wall thickness Tw. Tw may be an average wall thickness value that has been estimated for all specimen containers 102 and stored in memory of computer 130, 730 or Wi may be obtained from a lookup table in memory based upon the tube type determined based upon the outer width W and the height HT value (based on determining TC) for the specimen container 102.

Moreover, from HSP, and Wi, the volume of the liquid region (e.g., the serum or plasma portion 213SP) may be determined using Eqn. 1 below for the 3D model.

$$VSP = HSP \times Pi/4 \, Wi^2 \qquad \text{Eqn. 1}$$

To quantify the settled blood portion 213SB, a similar method may be followed. The pixels corresponding to the class of settled blood portion 213SB may first be identified by the classifier. Depending on whether a gel separator 313 is present, height of the settled blood portion HSB for each viewpoint may be determined by locating the lowermost pixel of the settled blood portion 213SB in each consolidated 2D image data set and then subtracting either SB or BG. SB may be determined. In the gel separator 313 is present, then BG may be determined for each viewpoint by averaging the lowermost vertical locations of pixels classified as gel separator 313. The lowermost pixel of the settled blood portion 213SB may be determined by finding the lowest-most vertical dimension of the specimen container 102 and then subtracting the wall thickness Tw for each viewpoint. Wi may be determined by subtracting Tw from W. A final value of HSB may be determined by averaging the respective HSB values of each of the viewpoints. From the final value of HSB and Wi, the volume of the settled blood portion 213SB may be determined using Eqn. 2 below for the 3D model.

$$VSB = (HSB \times Pi/4 \, Wi^2) - \tfrac{1}{2} Wi^2 + (Pi/24) Wi^3 \qquad \text{Eqn. 2}$$

Optionally, the various pixel classes of the consolidated 2D images for each of the viewpoints can be aggregated and mapped to reconstruct a 3D virtual voxel grid surrounding the specimen container 102. Each pixel has a defined location in a 2D virtual grid, which than can be projected onto the 3D virtual voxel grid from the three directions to generate the 3D model of characterized pixels. Grids from the 2D perspective are aligned with the 3D virtual voxel grid based upon calibration information between the image capture devices 434A-434C and pose for each viewpoint. Some redundancy (overlap) between the edge structures of each 2D grid may be present. The classes, having been assigned for each consolidated 2D image data set, may be grouped together for each viewpoint to form regions of: serum or plasma portion 213SP, settled blood portion 213SB, gel separator 313 (if present), air 216, tube 215, label 218, and cap 214, for each viewpoint. Voxels of each respective region are traversed onto the 3D virtual voxel grid, and if the classes are consistent between the adjacent viewpoints then the pixels in the overlapping region are assigned the common class.

As a result, the various regions are mapped to the 3D model and each region can be quantified using the calibration information and measurements from the 3D virtual voxel grid. The region locations of the 3D model may be used to determine where to place the aspiration probe tip so that no air 216 or settled blood portion 213SB or gel separator 313 are aspirated.

Once the liquid region is identified, a presence of an interferent (e.g., H, I, and/or L) therein may be determined by operating on the 2D data sets of the liquid region with one or more interferent classifiers. The backlighting for H, I, and/or L detection may include a pattern such as pattern 444A, 444B, or 444D shown in FIGS. 4D, 4E, and 4H, respectively, thereby mitigating vertical and/or lateral stray light. In one embodiment, a separate classifier may be used for each of H, I, and L as described in U.S. Provisional Patent Application 62/288,375 filed Jan. 28, 2016 and entitled "METHODS AND APPARATUS FOR DETECTING AN INTERFERENT IN A SPECIMEN." It should also be recognized that averaged values may also be used to provide HIL index values (Havg, Iavg, Lavg) that may be used to provide interferent levels for the specimen 213 as an average of the multiple viewpoints. In this way, one consistent classification may be obtained for H, I, L or N (Normal) for the 3D model.

At the characterization apparatus 112, 712, a presence of an artifact (e.g., clot, bubble, and/or foam) may be determined by operating on the 2D data sets of the liquid region with one or more artifact classifiers. If multiple viewpoints, each viewpoint may be used to generate an area for that particular view. The areas of the artifacts from the various viewpoints may then be used to determine an estimated volume of the artifact. 2D images may be used to triangulate structures in 3D where volume may be derived from geometric computation. An estimated volume of the artifacts may be subtracted from the volume VSP, so that a better estimate of the available liquid is provided. The various viewpoints can be used to project the location of the artifact onto the virtual 3D voxel grid and the dimensions from each 2D projection can be used to even better estimate the volume and 3D location of the artifact. Artifact detection is described in U.S. Provisional Patent Application 62/288,358 filed Jan. 28, 2016 and entitled "METHODS AND APPARATUS FOR CLASSIFYING AN ARTIFACT IN A SPECIMEN."

Accordingly, it should be apparent that the present characterization apparatus 112, 612, 712 including pattern generation capability and methods using same may result in a rapid quantification of the serum or plasma portion 213SP and/or the settled blood portion 213SB of the specimen 213, and/or also of the specimen container 102. Final results and determinations can be aggregated across the multiple viewpoints and displayed as a 3D model.

Figure 9:
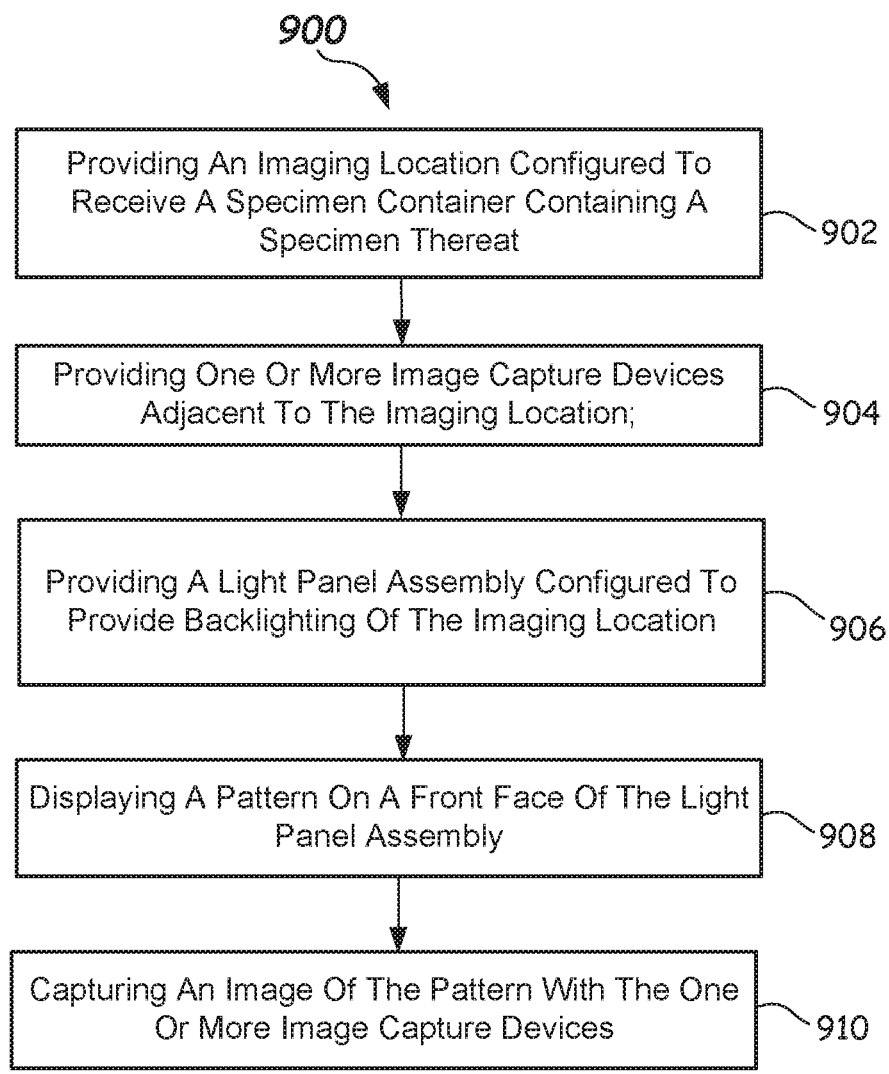
FIG. 9 is a flowchart of a method of characterizing according to one or more embodiments.

FIG. 9 illustrates a flowchart of a method 900 of characterizing a specimen container 102 and/or a specimen 213 wherein many items may be characterized using the characterization apparatus 112, 612, 712. According to one or more embodiments, method 900 includes, in 902, providing an imaging location (e.g., imaging location 432, 632, 732) configured to receive a specimen container (e.g., specimen container 102) containing a specimen (e.g., specimen 213, which may include serum and plasma portion 213SP) thereat. In 904, the method 900 includes providing one or more image capture devices (e.g., image capture devices 434, 434A-434C) adjacent to the imaging location (e.g., imaging location 432, 632, 732).

The method 900 includes, in 906, providing a light panel assembly (e.g., light panel assembly 436, 436A-436C) configured to provide backlighting of the imaging location (e.g., imaging location 132, 632). In 908, the method 900 includes displaying a pattern (e.g., pattern 444, 444A-444G) on a front face (front surface 436S) of the light panel assembly (e.g., light panel assembly 436, 436A-436C), and, in 910, capturing an image of the pattern (e.g., pattern 444, 444A-444G) with the one or more image capture device (e.g., image capture devices 434, 434A-434C). The images captured may be multi-spectral (e.g., R, G, B, white light, UV, IR and/or near IR) and multi-exposure images, as discussed above. The images may be captured at multiple viewpoints.

The images may then be further processed to determine segmentation in in the manner described above. Likewise, images captured in 910 may be used for characterization of H, I, and/or L. Moreover, the images may be used for identifying and quantification of the serum or plasma portion 213SP in accordance with the methods described herein. Quantifying the liquid may involve the determination of certain physical dimensional characteristics of the specimen 213 such as a physical locations of LA, SB, SG, and/or BG, and/or determination of HSP (depth of the serum or plasma portion 213SP), HSB (depth of the settled blood portion 213SB), and/or HTOT, and/or a volume of the serum or plasma portion (SP) and/or a volume of the settled blood portion (VSB) as discussed above. The inner width (Wi) may be obtained from the specimen container characterization.

To provide an even closer measurement of the actual volume of serum or plasma portion 213SP that is available for testing, or simply to flag the presence of an artifact, an artifact detection method may be employed to identify a presence of clot, bubble, or foam in the serum or plasma portion 213SP. Pattern illumination may be used to minimize stray backlight. The respective estimated volume of the one or more artifacts present may be subtracted from the estimated volume of the serum or plasma portion VSP determined in order to obtain a better volume estimate. The 2D image data for each viewpoint may be processed using artifact classifiers to determine the presence or absence of an artifact in the serum or plasma portion 213SP. The pixels identified as being an artifact by artifact detection may then be ignored in the quantification method described herein, but may also be ignored in the HIL classification, so as not to skew the results. Detection of an artifact may also initiate remediation in some embodiments.

Further characterization of the specimen container 102 may also be accomplished according to the broader method 900. The characterization of the tube type, cap type, cap color from the various viewpoints may be supplied and may enable the generation of the 3D model. The data from the various views may be compared so as to verify that the same characterization was achieved based on processing the images from each viewpoint. If slightly different values are obtained, then the values may be averaged. All of the outputs from the HIL classification, specimen quantification, artifact detection, and specimen container detection in accordance with methods described herein may be used to generate the 3D model. The 3D model may be used for final decision making, characterization, and/or harmonization of the results from the various viewpoints.

While the invention is susceptible to various modifications and alternative forms, specific apparatus and method embodiments have been shown by way of example in the drawings and are described in detail herein. It should be understood, however, that it is not intended to limit the disclosure to the particular apparatus or methods disclosed but, to the contrary, the intention is to cover all modifications, equivalents, and alternatives falling within the scope of the appended claims.

What is claimed is:

1. A characterization apparatus, comprising:
    an imaging location configured to receive a specimen container containing a specimen;
    an image capture device located adjacent to the imaging location; and
    a light panel assembly located adjacent to the imaging location configured to provide back lighting of the imaging location, the light panel assembly further configured to display a pattern, wherein the pattern includes a lighted portion and an unlighted portion.

2. The characterization apparatus of claim 1, wherein the light panel assembly comprises:
    a light source; and
    a pattern generator configured to produce the pattern.

3. The characterization apparatus of claim 1, wherein the light panel assembly comprises a pattern generator configured to produce the pattern, and wherein the pattern generator is selected from a group including:
    a liquid crystal display,
    a thin film transistor screen,
    a light-emitting diode screen,
    an organic light-emitting diode screen,
    electroluminescent display,
    electronic paper,
    E Ink, and
    plasma display panel.

4. The characterization apparatus of claim 1, wherein the light panel assembly further comprises a spectrally-switchable light source.

5. The characterization apparatus of claim 4, wherein the spectrally-switchable light source includes a light source switchable between two or more of:
    white light,
    red light,
    green light,
    blue light,
    ultraviolet light,
    near infrared light, and
    infrared light.

6. The characterization apparatus of claim 1, wherein the light panel assembly comprises:
    a frame including a first side and a second side;
    a light source comprising a plurality of individual light sources arranged along the first side and the second side;
    a light guide positioned adjacent to the plurality of plurality of individual light sources; and
    a pattern generator positioned in front of the light guide and configured to produce the pattern.

7. The characterization apparatus of claim 6, further comprising:
    a mask positioned in front of the pattern generator; and
    a diffuser element.

8. The characterization apparatus of claim 1, wherein the pattern is selected from a group of patterns, including:
    a variable width pattern;
    a restricted illumination area pattern;
    a variable position pattern;
    a variable height pattern;
    a variable line number pattern;

a dot illumination pattern;
a dot array pattern;
a modulation transfer function estimation pattern;
a Gray-code pattern; and
combinations thereof.

9. The characterization apparatus of claim 1, wherein the pattern is switchable.

10. A characterization apparatus, comprising:
a specimen carrier locating a specimen container containing a specimen at an imaging location;
a light panel assembly located adjacent the imaging location and configured to provide back lighting of the imaging location, the light panel assembly further configured to display a pattern, wherein the pattern includes a lighted portion and an unlighted portion; and
an image capture device configured to capture an image of the pattern at the imaging location as imaged through the specimen container and specimen.

11. The characterization apparatus of claim 10, wherein the pattern is selected from a group of patterns, including:
a variable width pattern;
a restricted illumination area pattern;
a variable position pattern;
a variable height pattern;
a variable line number pattern;
a dot illumination pattern;
a dot array pattern;
a modulation transfer function estimation pattern;
a Gray-code pattern; and
combinations thereof.

12. The characterization apparatus of claim 10, wherein the light panel assembly further comprises a spectrally-switchable light source.

13. The characterization apparatus of claim 12, wherein the spectrally-switchable light source includes a light source switchable between two or more of:
white light,
red light,
green light,
blue light,
ultraviolet light,
near infrared light, and
infrared light.

14. The characterization apparatus of claim 10, comprising an enclosure, the specimen container containing a specimen and at least a front face of the light panel assembly is included in the enclosure, and wherein the pattern is a restricted illumination area pattern operating to reduce an amount of stray light within the enclosure.

15. A method of characterizing a specimen container and/or a specimen, comprising:
providing an imaging location configured to receive a specimen container containing a specimen thereat;
providing one or more image capture devices adjacent to the imaging location;
providing a light panel assembly configured to provide backlighting of the imaging location;
displaying a pattern on a front face of the light panel assembly, wherein the pattern includes a lighted portion and an unlighted portion; and
capturing an image of the pattern with the one or more image capture devices.

16. The method of claim 15, wherein the pattern is selected from the group of patterns including:
a variable width pattern;
a restricted illumination area pattern;
a variable position pattern;
a variable height pattern;
a variable line number pattern;
a dot illumination pattern;
a dot array pattern;
a modulation transfer function estimation pattern;
a Gray-code pattern; and
combinations thereof.

17. The method of claim 15, comprising switching the pattern displayed to another pattern.

18. The method of claim 15, comprising determining one or more of:
a scattering property of the specimen;
a transmittance property of the specimen;
an absorption property of the specimen;
a refractive index of the specimen; and
a fluid turbidity of the specimen.

19. The method of claim 15, comprising determining a presence of an interferent, wherein the interferent is one or more of hemolysis, icterus, and/or lipemia contained in a specimen.

20. The method of claim 15, comprising determining a presence of an artifact in the specimen, wherein the artifact comprises one or more of a clot, a bubble, or foam.

21. The method of claim 15, wherein the capturing of the image of the pattern is through the specimen container and/or specimen.

22. The method of claim 15, comprising capturing one or more reference images of the pattern.

* * * * *